(12) United States Patent
Clifton-Bligh

(10) Patent No.: US 6,775,659 B2
(45) Date of Patent: *Aug. 10, 2004

(54) METHODS AND DEVICES FOR MAPPING DATA FILES

(75) Inventor: Gervase Clifton-Bligh, London (GB)

(73) Assignee: Symtec Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,860

(22) Filed: Dec. 28, 1999

(65) Prior Publication Data

US 2003/0050906 A1 Mar. 13, 2003

Related U.S. Application Data

(63) Continuation of application No. PCT/GB99/02820, filed on Aug. 26, 1999, and a continuation-in-part of application No. PCT/GB98/03481, filed on Nov. 20, 1998.

(30) Foreign Application Priority Data

Aug. 26, 1998 (GB) ............................................. 9818633
Nov. 11, 1998 (GB) ............................................. 9824779

(51) Int. Cl.⁷ ............................. G06F 17/30; G09G 5/00
(52) U.S. Cl. ........................... 707/1; 707/102; 345/734; 345/854
(58) Field of Search ................................ 345/733–739, 345/853–855; 707/1, 10, 100–104.1, 200; 709/216–219, 227–229, 238–245

(56) References Cited

U.S. PATENT DOCUMENTS

| | | | |
|---|---|---|---|
| 4,566,001 A | | 1/1986 | Moore et al. ................ 345/173 |
| 5,341,466 A | | 8/1994 | Perlin et al. ................. 345/668 |
| 5,583,833 A | | 12/1996 | Capps et al. ................. 368/185 |
| 5,619,632 A | * | 4/1997 | Lamping et al. ............. 345/441 |
| 5,877,766 A | | 3/1999 | Bates et al. .................. 345/854 |
| 5,912,674 A | * | 6/1999 | Magarshak .................. 345/440 |
| 5,926,180 A | * | 7/1999 | Shimamura .................. 345/739 |
| 5,958,008 A | * | 9/1999 | Pogrebisky et al. ......... 709/223 |
| 5,966,128 A | * | 10/1999 | Savage et al. ............... 345/853 |

(List continued on next page.)

FOREIGN PATENT DOCUMENTS

| | | |
|---|---|---|
| GB | 2 145 257 | 3/1985 |
| WO | WO 98/20436 | 5/1998 |
| WO | WO 99/10820 | 3/1999 |

OTHER PUBLICATIONS

Cowart, Robert, "Mastering Windows (TM) 3.1, Special Edition," SYBEX, Alameda, CA 94501, 1993, pp. 103–109 and 118–123.*

(List continued on next page.)

*Primary Examiner*—Maria N. Von Buhr
(74) *Attorney, Agent, or Firm*—Fish & Richardson P.C.

(57) ABSTRACT

A method of mapping interconnections between a plurality of data files, such as files of the world wide web. The method comprises a step of, for a first file, in a display area displaying a first region. Then, according to a first distance scale, displaying one or more second regions, which respectively represent one or more second files logically related to the first file, for example by hyperlinks. The second regions are spatially related in a display to the first region. In (n−1) further steps, i=2, . . . , n, the method displays according to an i-th distance scale smaller than the (i−1)-th distance scale one or more (i+1)-th regions. Each of these (i+1)-th regions respectively represent one or more (i+1)-th files which are logically related to the i-th file, and they are spatially related on a display to the i-th region representing that i-th file. The method may be implemented in software, for example in a web browser.

42 Claims, 24 Drawing Sheets

U.S. PATENT DOCUMENTS

| | | | | | |
|---|---|---|---|---|---|
| 6,028,602 | A | * | 2/2000 | Weidenfeller et al. | 345/340 |
| 6,040,834 | A | * | 3/2000 | Jain et al. | 345/356 |
| 6,104,400 | A | * | 8/2000 | Halachmi et al. | 345/854 |
| 6,177,936 | B1 | * | 1/2001 | Cragun | 345/340 |
| 6,189,019 | B1 | * | 2/2001 | Blumer et al. | 707/513 |
| 6,219,053 | B1 | * | 4/2001 | Tachibana et al. | 345/835 |
| 6,222,559 | B1 | * | 4/2001 | Asano et al. | 345/440 |
| 6,285,367 | B1 | * | 9/2001 | Abrams et al. | 345/854 |
| 6,300,957 | B1 | * | 10/2001 | Rao et al. | 345/441 |
| 6,628,304 | B2 | * | 9/2003 | Mitchell et al. | 345/734 |
| 2002/0054166 | A1 | | 5/2002 | Decombe | 345/853 |
| 2002/0145623 | A1 | | 10/2002 | Decombe | 345/734 |

OTHER PUBLICATIONS

"WWW Fisheye–View Graphical Browser"; Debora C. Muchaluat et al.; XP–000987383; Laboratorio TeleMidia, Depto. De Informatica, PUC–Rio, R. Marques de Sao Vicente 225—22453–900—Rio De Janeiro, Brazil; pp. 88–89, Dec. 10, 1998.

"Interacting with Huge Hierarchies: Beyond Cone Trees" Jeromy Carriere, et al.; Computer Graphics Lab, Department of Computer Science; University of Waterloo, Waterloo, Ontario Canada; XP–002163253; pp. 1–8, Oct. 30, 1995.

International Search Report; PCT/GB98/03481; Mar. 29, 1999; R. Abbing.

International Search Report; PCT/GB99/02820; Dec. 13, 1999, R. Abbing.

Journal of Visual Languages and Computing (1996); "The Hyperbolic Browser: A Focus +Context Technique for Visualizing Large Hierarchies"; Jonh Lamping and Ramana Rao; Received Apr. 3, 1995 and accepted Sep. 29, 1995; pp. 33–55.

"Tree–Maps: A Space–Filling Approach to the Visualization of Hierarchial Information Structures"; Brian Johnson and Ben Shneiderman; Dept of Computer Science & Human–Computer Interaction Laboratory, University of Maryland, College Park, MD 20742; pp. 284–291, Oct. 22, 1991.

"Hypermedia exploration with interactive dynamic maps"; Int. J. Human–Computer Studies (1995); Mountaz Zizi and Michel Beaudouin–Lafon; pp. 441–464.

"Seeing the Forest for the Trees: Hierarchical Display of Hypertext Structure"; Department of Computer Science, Columbia University, New York, NY 10027; Steven Feiner; pp. 205–212, Mar. 1988.

* cited by examiner

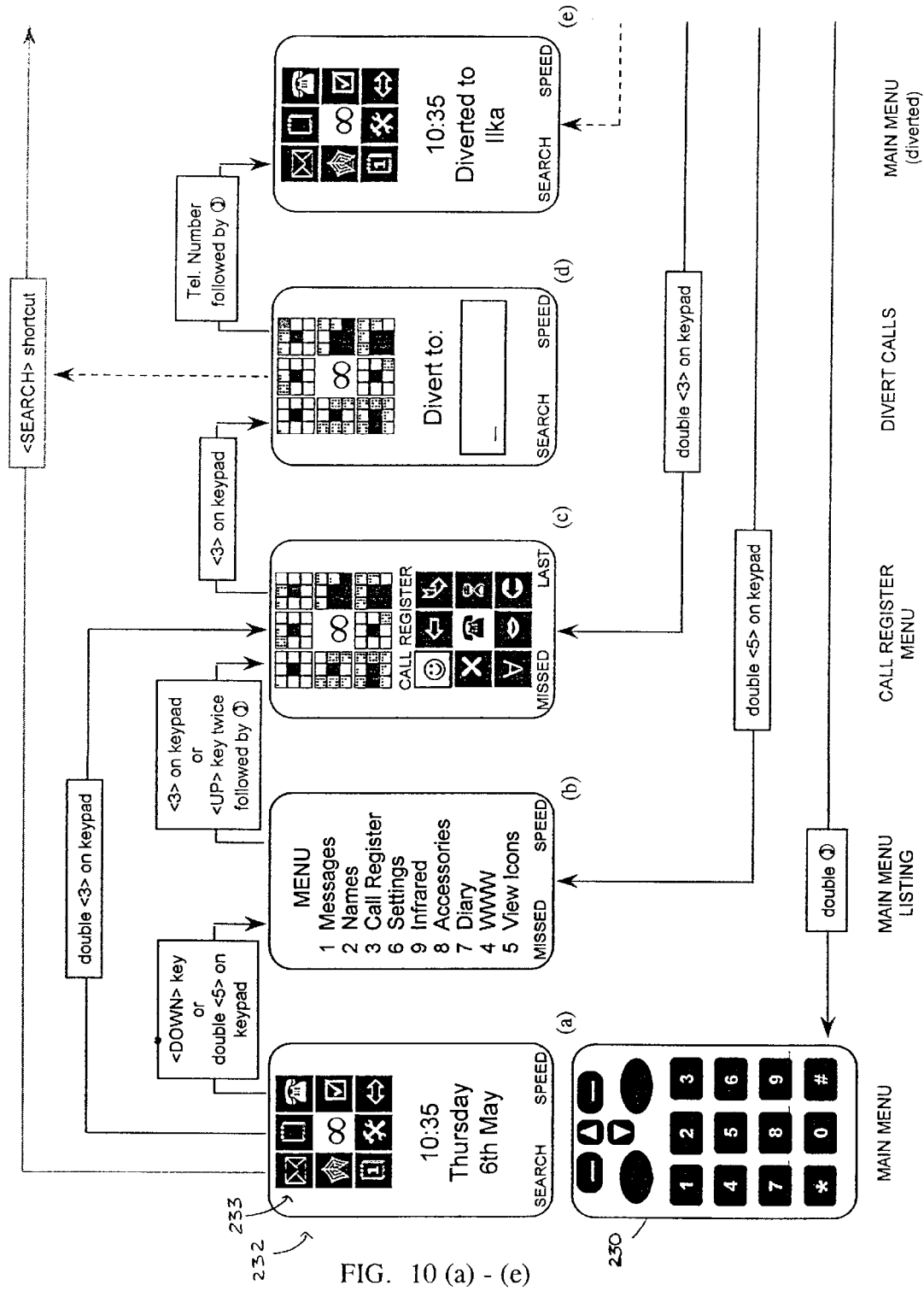
FIG. 10 (a) - (e)

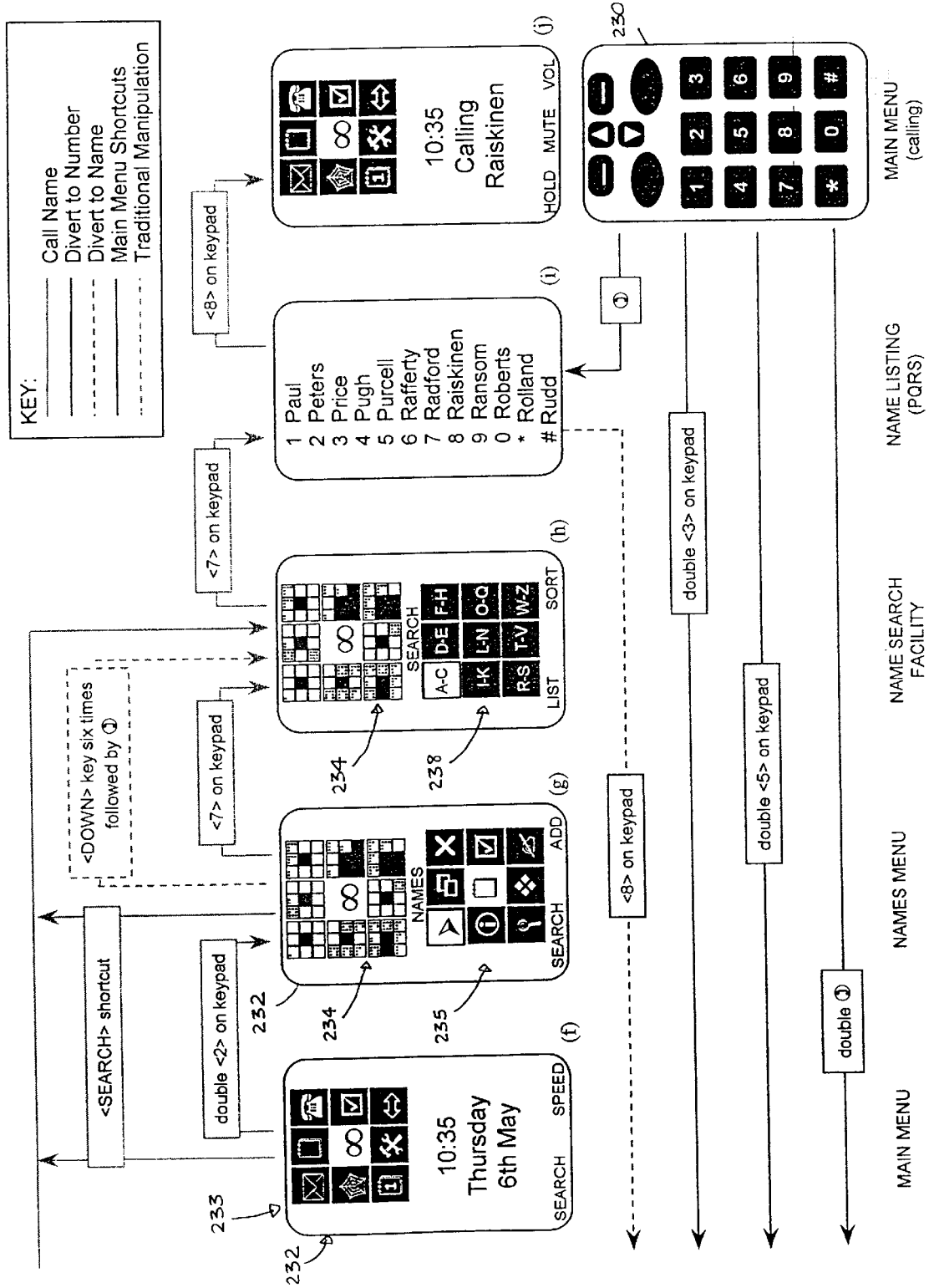
FIG. 10 (f) - (j)

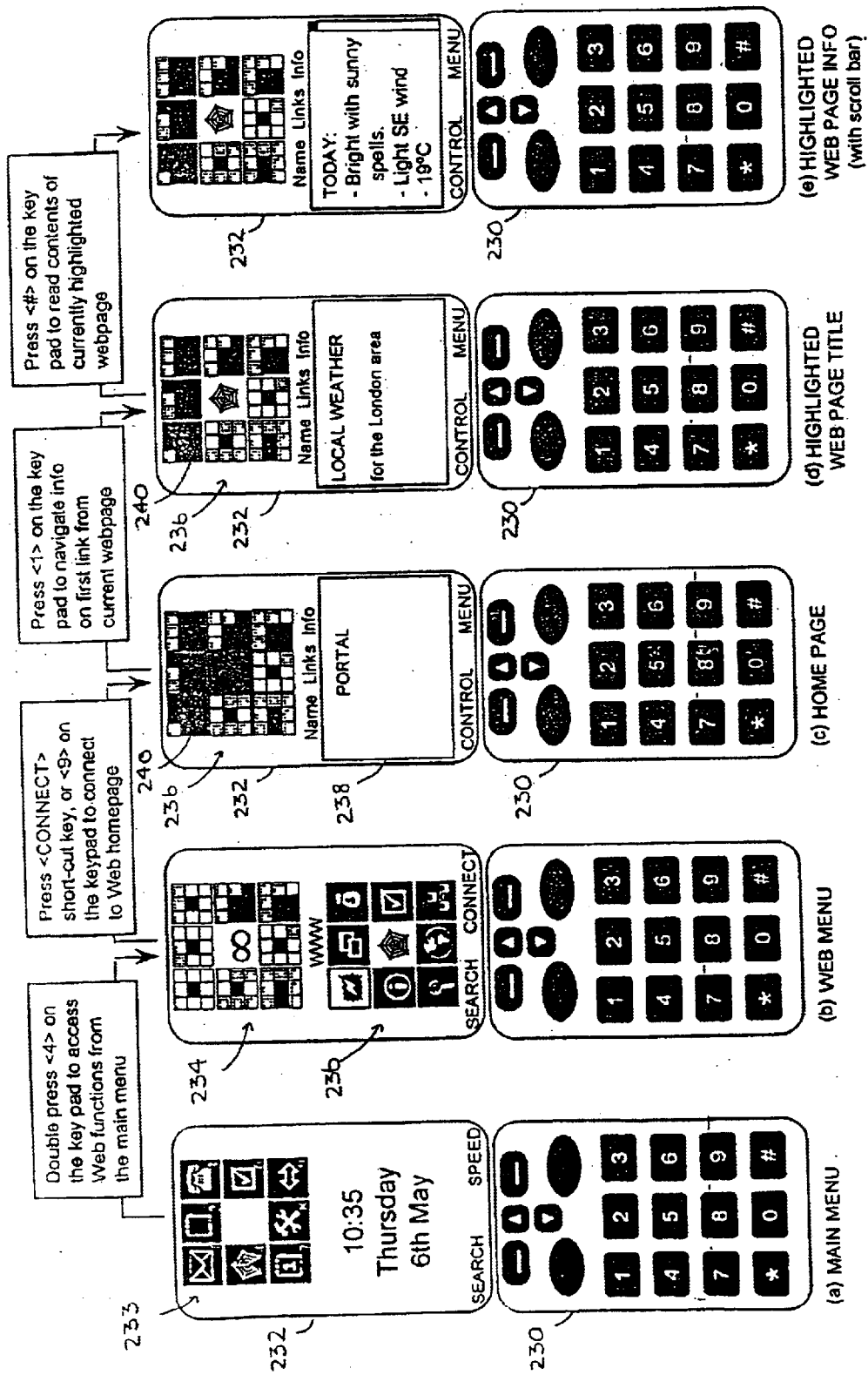
FIG. 11 (a) – (e)

FIG. 13 (a) – (b)

METHODS AND DEVICES FOR MAPPING DATA FILES

CROSS-REFERENCES TO RELATED APPLICATION

The present application is a continuation application based on PCT/GB99/02820, filed Aug. 26, 1999, and now pending. PCT/GB99/02820 claimed priority from other applications, including PCT/GB98/03481 which designated the United States of America.

The present application is also a continuation-in-part application based on PCT/GB98/03481, filed Nov. 20, 1998, and now pending.

FIELD OF THE INVENTION

This invention relates to methods for mapping relationships between data files (or portions of a single data file), methods of moving between data files (or within a data file), and to an apparatuses arranged for performing the methods. The invention further relates to a device including a display which displays a map of data files, particularly a device having a low resolution screen either in absolute terms or in relation to the number of data files which are to be mapped (e.g. 100s or even 1000s of files).

The files referred to throughout this document may be electronic files, but may alternatively be files stored on any other recording medium, for example an optical or holographic data storage medium. As discussed in detail below, the invention is particularly suitable, for example, for displaying relationships between data files which are part of the world wide web.

DISCUSSION OF THE PRIOR ART

The vast amount of information stored on the world wide web is divided into data files, each of which has an "address", and is stored on a computer called a "server". One kind of file is called a "page" and simply contains a set of information. The format of the information differs from one page to another, for example, some pages may contain just text, while others might for instance reference some audio or visual files to display at a certain point in the pages. Using a program called a "browser", a user of the web is able to display the pages in a part of his or her screen called a "browser array", for example one page at a time. Specifically, the user may be said to have a location within the web which corresponds to a page of the web, and to view the page which corresponds to his location.

Like the pages of a conventional book which are arranged in a numbered sequence, the pages of the world wide web have defined logical relationships to each other, but the logical relationships between the pages of the web are much more complicated than a simple numbered sequence. The purpose of these logical relationships is to connect pages which contain related information. For example, a page containing information on a first topic (say "patents") may be logically related to one or more other pages containing information on related topics (such as "patent attorneys").

The logical relationships between pages are defined by logical links known as "hyperlinks". The hyperlinks are conventionally defined in a "hypertext" programming language (or possibly a more sophisticated content presentation format such as a Flash or Lingo file), the type of language upon which the world wide web is based (the term hypertext is commonly used to include "hypertext mark-up language" (HTML), Dynamic HTML, Wireless Markup Language (WML), Active Server Pages, etc), and the term "hyperlink" is further used here to mean a link in an AWT such as one defined in JAVA, or any other languages used for layout and interaction. A single page may contain one or more "hyperlinks" each associated with a portion of the page (e.g. a few words of that page) known as an "anchor". The hyperlink defines a logical relationship between the "anchor" portion of the page and a second page of the world wide web (or possibly a particular place in that second page). A user can access that second page simply by positioning a curser in the anchor portion of the display and clicking a button, such as a button of a mouse. This automatically replaces the page he is viewing with the second page connected to it by the hyperlink. Thus, the second pages are said to be "one click" from the first page, meaning that a user connected to the first page can access the second pages (i.e. display some or all of the information in the second page within his browser array) by a single clicking motion (not including clicks performed by the user on the scrollbar). The first page may contain any number of anchors, each associated with a respective portion of the first page, and each leading via a respective hyperlink to a respective second page.

Of course, a second page too may have anchors in it, each leading to a respective third page. The third pages are said to be "two clicks" from the first page, meaning that they can be accessed from the first page by two clicking motions, a first clicking motion which takes the user from the first page to the second page (i.e. changes the browser display to represent the second page, or represents that page in a second browser display), and a second clicking motion which moves the user from the second page to the third page. The hyperlinks thus provide an efficient way of navigating through the myriad of pages available on the web in search of specific information, by moving between the pages logically related by hyperlinks. Since any page may contain many anchors, there can be many second pages related to each first page, and many third pages related to each second page. In fact, the number of pages n-clicks away from a given first page rises approximately exponentially with n.

A further complexity is provided by a type of file called a "frame set". Although pages of the world wide web may be unstructured, in the sense that they consist entirely of a list of stored information, a "frame set" does have a structure, and may be thought of as a file which partitions the browser array into a number of sections and displays another predetermined file in each of those sections, for example so that different sorts of information on a given topic are classified into different sections. Any number of anchors may be located in any of the files displayed in the sections. Supposing that a user uses a browser to access a first file which is a frame set, the browser display area is divided into a number of sections corresponding to the number of sections in the frame set. When the user clicks on an anchor portion within one of the sections, that (or a different) section of the browser display area (or possibly the whole browser area or the whole of a new browser area) is replaced by a second file (e.g. a page) connected to the anchor portion by a hyperlink. However, the rest of the display area (i.e. the other sections of the frame set) remains displayed to the user.

The world wide web is in fact a single example of a networked computer file system based on a hypertext. Other examples of a hypertext based system include other Internet systems not for some reason classified as being the world wide web (for example, because they are owned by a large company or government department and not publicly accessible), so-called "intranet" systems, or indeed any other system using a hypertext language (such as HTML or Dynamic HTML) to define and permit movement between files. These systems are in turn examples of what may be called a "hyperspace", that is a set of data files, each having an address or name, the set of files having logical relationships defined between members of the set.

For example, a conventional directory structure is an example of a hyperspace. A directory structure consists of data files of two forms: (i) data files here called "branch nodes" which contain (usually only contain) logical links to other data files, and (ii) data files called "leaf nodes" which may contain information but do not contain links to other data files of the hyperspace. An empty directory is an example of a leaf node, as is a text file, a picture file, a video file or an audio file; and a directory which is not empty is an example of a branch node.

Such a logically related set of data files may be a pure hierarchy (tree structure). That is, one directory (the "root directory") is designated the uppermost level of the hierarchy. There is a maximum of one logical link to each directory (although the directory itself may contain any number of logical connections to other data files), and every data file (including all the directories) can be reached from the root directory by a single path, along a series of the logical connections defined above. The data files which can be reached by a single logical link from a given directory are said to be "in" the directory. Here, we will refer to a data file which can be reached from the top directory by following i logical links as being in the (i+1)-th level (the root directory is the first level).

In fact, a directory structure may not be a pure tree structure, because of "short-cuts" for example, or because some HTML files and hyperlinks are included within the definition of the hyperspace in question. Thus a directory structure may be an example of a logical relation between files which form a tree-like structure (which approximates a tree structure), in which for example over 90% of the logical connections conform to a tree structure.

In a conventional tool for navigating a hierarchy of data files (e.g. Microsoft Windows or Microsoft Explorer), a certain data file (e.g. leaf node) is reached along a path of logical connections from the root directory, e.g. along one or more intermediate directories, by the following procedure. Starting with the root directory (or from any other point), a symbol is drawn for each data file in the root directory. These symbols are drawn displayed in a column. The user clicks on the symbol representing the intermediate directory which is on the path to the data file he wishes to reach. Then the process is repeated, with that intermediate directory in the place of the top directory. To reach a data file in the (i+1)-th level requires i clicks. The last of these clicks is on a symbol representing the data file which the user wishes to reach.

During this process a user will only see a symbol representing a particular data file if that data file happens to be in one of the intermediate directories on the path. Therefore, it is essentially impossible for the user to gain an impression of the overall shape of the directory structure, for example whether the leaf nodes are uniformly distributed in the hierarchy. In other words, this navigation tool is not suitable for visualizing a directory structure.

To address the specific problem of visualizing a hierarchical directory structure, Brian Johnson and Ben Schneiderman ("Tree-Maps: A Space-Filling Approach to the Visualization of Hierarchical Information Structures", Proceedings of the Annual Conference on Visualization, San Diego, p284–291, IEEE, 1991) proposed drawing a two-dimensional diagram showing the data files of a directory. Each data file is represented by a rectangle in the diagram; the rectangles representing the data files in a certain directory are drawn inside the rectangle representing that directory (i.e. the nesting corresponds to the hierarchy), in a single row or column; in the case of leaf nodes, the rectangles are drawn with equal shapes and areas to each other.

In a directory structure of conventional size, say about 3000 files (perhaps in 20 layers), the areas representing leaf nodes become very small. Therefore, since this document is concerned only with visualising the distribution of leaf nodes, Johnson and Schneiderman recommend that the rectangles representing data files in any directory are sized so as to completely cover the rectangle representing that directory. Thus, the diagram proposed only contains areas representing leaf nodes. Thus, in the case of a typical directory structure (in which most leaf nodes are several links away from the top directory), the result is a diagram composed of a myriad of tiny rectangles (shown in FIG. 8 of the paper, in the case of a directory of 1000 files). Despite this complexity of this picture, it is possible from it quickly to ascertain statistical information about the distribution of leaf nodes in the data structure.

Since this technique is concerned with extracting statistical information about a complete directory structure, the technique provides no way of focussing on one part of a hierarchy.

Even if the technique of Johnson and Schneiderman was varied (which this paper does not suggest) by including the option of redrawing only a branch of the hierarchy (i.e. the data files which can be reached by logical links from a directory which is not the top directory), the result would be a second diagram in which all the data files of the branch of the hierarchy have different shapes from their shapes in the first diagram. Thus, the detailed correspondence between the first and second diagrams would be very hard to understand, except possibly on a statistical level.

John Lamping and Ramana Rao ("The Hyperbolic Browser: A focus and Context Technique for Visualising Large Hierarchies", Journal of Visual Languages and Computing, 1996, 7, p33–55) propose a radically different technique for visualising a hierarchical structure, in which the data files of the directory are represented by small areas which do not overlap, and the logical links between them by lines. The small areas are laid out on a hyperbolic plane mapped onto the display area, to give a "fisheye" distortion. The user may select the mapping between the hyperbolic display and the display area, to make possible visualisation of branches of the hierarchy, but again there is no exact correspondence between the first and second diagrams. The angles between the branches change as the user focuses on different areas of the map.

Neither document describes use of the diagram for a purpose other than visualisation. Neither document proposes a scheme which can be readily extended to hyperspaces which are not hierarchical. Thus, neither document proposes a technique well adapted to mapping the pages of the world wide web, which is a network of data files rather than a hierarchy.

Furthermore, in both cases the diagram proposed is necessarily highly intricate, and thus requires a display device having a high resolution, and a high enough screen size to make the detail visible. The "tree-map" requires that areas are drawn on scale dependent on the number of levels in the directory, and in the type of directory for which the tree-map is proposed this may mean that even the largest area is much less than a twentieth of the display area, while the smallest area may be much less than a thousandth of the display area. Similarly, the hyperbolic map requires that fine lines are drawn on a display to represent links.

SUMMARY OF THE INVENTION

The present invention seeks to provide a new and useful way of displaying interconnections of various forms between data files.

It preferably aims to provide a method for mapping logical relationships between data files which can be used in conjunction with a display device having limited resolution (e.g. a low number of pixels in each dimension in relation to the number of files to be mapped).

It further preferably seeks to provide devices which allow display of and/or navigation of the interconnections between data files.

It further preferably seeks to provide a mechanism of accessing various levels of limited data about files (e.g. titles) which allows the user to gain an impression of the significance of given file before opening the files.

In its broadest terms the present invention proposes, for a given first file (e.g. the current browser file), displaying (e.g. on a screen) an image including symbols representing second files one click away, and in or near the symbol for each second file further symbols representing third files one click from that second file. This display may be generalised beyond third files (two clicks from the first file) to include files any number of clicks (e.g. a predetermined number of clicks) from the first file. At any level, the files logically related to a given file may be represented by further symbols (e.g. smaller symbols) within, or clustering around, the symbol for that given file. The display may be used for navigation between the data files, permitting the user to open one of the data files (i.e. extract information from the data file).

Accordingly, a first aspect of the present invention is a method of mapping logical relations between a plurality of data files comprising:

a step of, for a first file, in a display area displaying a first region and one or more second regions, said second regions respectively representing one or more second files logically related to the first file and being spatially related to the first region, the sizes of said second regions being according to a first distance scale; and for a predetermined value of n, (n−1) further steps, i=2, . . . , n, of, for the or each i-th file, displaying one or more (i+1)-th regions, said (i+1)-th regions respectively representing one or more (i+1)-th files which are logically related to the i-th file, and being spatially related to the i-th region representing that i-th file, the sizes of said (i+1)-th regions being according to a respective i-th distance scale smaller than the (i−1)-th distance scale. The hyperlinks are preferably hypertext links.

The value of n may be as low as 2, but it is preferably higher (e.g. at least 3, at least 4, or even at least 10), and may be indefinitely large. n may depend upon any one or more of: (i) the resolution of the user's screen, (ii) the computer resources available for creating the display, (iii) the number of files a certain number of clicks away from the first file, or (iv) a selection by the user.

A preferred case is that the map is drawn for a certain predetermined value of n selected by the user, and then the user has the option of increasing n by one, so that the map is re-drawn according to the first aspect of the invention with this new value of n, thereby to include files one further logical link away from the first file.

Since the value of n may be chosen to be small (independent of the number of data files) the map may be drawn even on a screen with very limited display capacity. Below, preferred features of the display are listed which further improve the potential of the mapping method, especially in the specific technical case of a display of limited technical capacity (either in absolute or relative terms).

The "size" of a region may for example be the extent of the region in a predetermined direction. The extent of one or more (or all) of the regions may by substantially equal in two orthogonal directions, and in this case the "size" may be the extent in either direction. It may also be the area of the region.

The data files may be part of any hyperspace of data files. For example, the data files and the logical relationships between them may be a (hierarchical or tree-like) directory structure; in this case the logical relationships between the data files may be the links of the directory structure. For example, they may be part of a directory structure containing at least 4, at least 6, at least 10, at least 20 or at least 30 levels. In this case the number of data files in the directory is well-defined (countable), and may be at least 30, at least 100, at least 500, at least 1000 or at least 2000.

Alternatively, the data files may be files of the world wide web. In this case the total number of data files, in the case that n is very high, and practically uncountable.

Alternatively the data files may be part of any other hyperspace of data files which is not (or not necessarily) hierarchical, for example a web which is internal to a large company or government department. For example, the data files may be data files connected by hyperlinks (preferably hypertext links), which constitute the logical relations.

The plurality of files are preferably provided at a plurality of web sites (that is, a plurality of web domains). The files may, for example, include files of the world wide web provided at different sites by spatially separated servers.

The logical relationships may be any logical relationships (e.g. those defining a tree-structure or an approximate-tree structure). They may also be logical relationships (pre-) defined by a user or automatically, e.g. based on the meanings of the files.

The logical relationships are preferably of any type or types suitable for defining a hyperspace. Thus, the logical relationships between the files may be (or at least include) hyperlinks (preferably hypertext links) and optionally also the connection(s) between frames and the file(s) they display. More preferably, the logical relationships are such that each i-th file and its one or more (i+1)-th files are such that the (i+1)-th file can be reached from the i-th file by one click. That is, they are connected to the i-th file by a single hyperlink connection.

Thus, if n were indefinitely large, the entire world wide web (all files which can be reached by any number of clicks) could in principle be represented by the display generated by the method. In practice, only pages up to, say, n=10 clicks away may be displayed (or those which generate regions having say a radius larger than 5 pixels), but this nevertheless may mean a very large number of pages.

Note that the i-th distance scale may be different for different i (e.g. it may depend upon the number of (i+1)-th files. For example, in the case that there are a large number of (i+1)-th files logically related to a given i-th file, the i-th distance scale may be small, e.g. so that there is space to represent all the (i+1)-th files.

We will now define some useful terminology: for a given data file, its "parent" files are all files (e.g. in a certain map)

from which it can be reached by one logical relation (e.g. one clicks), while its "ancestor" files are all files (e.g. in a certain map) from which it can be reached by any number of logical relationships. Its "sibling" files are files sharing at least one parent. Its "child" files are those files to which it is a parent. Its "descendent" files are those files to which it is an ancestor.

For any map generated according to the invention (in any of its aspects), the "origin" of a data map is the file from which distances in terms of clicks are measured (e.g. the "root" directory of a directory structure, or in some embodiments the web browser location). The "base" is defined in relation to a particular map and is equivalent to the first file drawn. The "focus" is the user's current "location" within the map. The "highlight" is the area, label, or other identifying device that is at any one time highlighted, or indicated for immediate selection, by the user.

Also, although the method does not draw regions for a number of clicks greater than n from the first file, the method may not necessarily draw regions for all files up to n clicks away from the first file. For example, in that case that there are a large number of (i+1)-th files are logically related to a given i-th file, and each (i+1)-th region is small (e.g. below a predetermined size), (i+2)-th files logically related to these (i+1)-th files may not be displayed.

Thus, this is a possible criterion for not representing certain files. Another possible criterion is that if the same file would be represented more than once (because it can be reached from the first file by more than one route) all but one of those representations may be omitted. Alternatively, regions representing its children may be omitted from all but one of its representations (that is, the criterion for omitting files is that (i) the file would otherwise be shown elsewhere and also that (ii) the parent would be represented more than once).

Note that the logical relations are preferably those which are uni-directional. That is, even if a first file is logically related to a second file, this does not imply that the second file is logically related to the first. An example of such a logical relationship is a hyperlink.

The concept of mapping data files which are linked by hyperlinks (and thus which may not be part of a hierarchical directory structure) constitutes an independent second aspect of the invention.

According to this second aspect of the invention the invention provides a method of mapping hyperlinks between a plurality of data files comprising:

a step of, for a first file, in a display area displaying a first region and one or more second regions, said second regions respectively representing one or more second files which are accessible from the i-th file by a hyperlink, and being spatially related to the first region, the sizes of said second regions being according to a first distance scale; and (n−1) further steps, i=2, . . . , n, of, for the or each i-th file, displaying one or more (i+1)-th regions, said (i+1)-th regions respectively representing one or more (i+1)-th files which are accessible from the i-th file by a hyperlink to the (i+1)-th file, and being spatially related to the i-th region representing that i-th file, the sizes of said (i+1)-th regions being according to an i-th distance scale smaller than the (i−1)-th distance scale. The hyperlinks are preferably hypertext links.

The term "file" as used herein includes "frame set" within its scope. If a given file is a frame set, the region which represents the file preferably indicates this. For example, in the case that an i-th file is a frame set partitioned into j sections (here numbered k=1, . . . j), the i-th region which represents the i-th file is preferably shown partitioned into j sections (k=1, . . . , j). The (i+1)-th regions are then drawn accordingly, so that the (i+1)-th regions which represent those files which are linked to the i-th file by anchors within the k-th section of the i-th file, are within the k-th section of the i-th region.

A further alternative is that the logical relationships may not be predefined (e.g. by hyperlinks), but rather depend on the meanings of the files (e.g. a thesaurus), and even be chosen by the user. For example, if the information stored in the data files concerned companies and their employees, the user could define a rule such that:

"A second data file is logically related to a first data file, if and only if either the first represent an employee and the second a company the employee has worked for in the past, or the first represents a company and the second a current employee of that company."

The concept of defining (or redefining) logical relationships constitutes a third independent aspect of the invention, which is a method of mapping logical relationships between a plurality of data files, comprising:

a step of defining a rule which determines whether any one of said data files is logically related to any other one of said data files;

a step of, for a first file, in a display area displaying a first region representing that i-th file and one or more second regions, said second regions respectively representing one or more second files and being spatially related to the first region; and (n−1) further steps, i=2, . . . , n, of, for the or each i-th file, displaying one or more (i+1)-th regions, said (i+1)-th regions respectively representing one or more (i+1)-th files logically related to the i-th file, and being spatially related to the i-th region. Preferably, in this third aspect of the invention too, the second regions are according to a first distance scale (e.g. the sizes or spatial relationships are according to the first distance scale), and all said (i+1)-th regions of an i-th region are according to an i-th distance scale smaller than the (i−1)-th distance scale (e.g. the sizes or spatial relationships are according to the i-th distance scale).

The user may optionally select the logical relationship from a number of predetermined options.

In any of the aspects of the invention defined above, the first file may be a file which is currently being displayed by a user (e.g. a data file which corresponds to the user's present (system or net) browser location). Alternatively, it may be one selected by the user, as described further below. In either case, the methods of the invention described above create a map based on a first file and indicating the existence and distance (e.g. measured in clicks) of other files related to the first file.

We will now discuss a number of geometrical features of the map which have significant technical consequences and which are preferred features of a map produced according to all aspects of the invention.

The number of n-th files rises approximately exponentially with n, so for large n, to avoid the display becoming larger than the user's screen, the distance scale must decrease accordingly. For example, the distance scale may be chosen to decrease such that the total area of the map is "bounded", by which we mean that no matter how great the value of n, the total area of the display never exceeds a predetermined value. This is a preferred feature of maps produced by all methods according to the invention.

As one example of a bounded map, the distance scale may be chosen such that the total area of the one or more (i+1)-th regions for each i-th file is less than (e.g. half) the area of the i-th region representing the i-th file.

In this case, the (i+1)-th regions for each i-th file may be non-overlapping and all within the i-th region which represents that i-th file. However, this is not the only possibility: for example, the (i+1)-th regions for each i-th file may be arranged to cluster around the i-th region which represents that i-th file, or the (i+1)-th regions may each partly overlie the i-th region.

The display generated by the method may thus have an appearance resembling a "fractal" form, that is with an increasingly detailed (scalable) structure (the number of i-th regions rising with i) on an increasingly small distance scale (for example, the width of an average i-th region). For high enough n, every file accessible by clicks within the world wide web would be represented by one or more regions in the fractal-like display.

For example, as described above, in the case that the (i+1)-th regions for each i-th file are always within the i-th region which represents that i-th file, the map will be generated entirely within the first region, and the total area occupied by the regions (e.g. the sum of all points which are inside at least one of the regions) is equal to the area of the first region. This is true whatever the value of n, and however many regions there are for each value of i.

This feature, of the total area occupied by the regions of the map being independent of n, is herein called "intensiveness". Any map in which the total area occupied by the regions of the map (i.e. the total area which is inside at least one region) does not depend upon n (at least for n greater than some certain value, in this case n=1), is herein called "intensive".

For each i-th file, the (i+1)-th regions preferably do not overlap one another and their areas are preferably equal to each other, but the (i+1)-th regions for first i-th file may be of a different size to the (i+1)-th regions of a second i-th file. More generally, the i-th distance scales may be different for different i-th regions. For example, if there are 20 files one click away from a first i-th file, and 10 files one click away from a second i-th file, then the area of the 20 (i+1)-th regions for the first i-th file may be smaller than (e.g. half) the area of the 10 (i+1)-th regions of the second i-th file. More generally, the areas of each of the (i+1)-th regions for an i-th file are preferably selected to be less than the area of the i-th region which represents that i-th file by a proportion which depends in a predetermined way on the number of (i+1)-th regions for that i-th file. For example, in the case that the (i+1)-th regions for a given i-th file are within the corresponding i-th region, the (i+1)-th regions may be as large as possible within the constraint of a predetermined size and arrangement rule.

Furthermore, it is possible for the (i+1)-th regions related to a given i-th region to be of identical sizes, or of differing sizes from each other (e.g. to indicate that the number of times that they have been visited) but defined based on the same distance scale. For example, the respective sizes (e.g. diameters) of the (i+1)-th regions of a given i-th file might be defined as the i-th distance scale multiplied by value which is a function of a variable characterizing the respective (i+1)-th file (such as the number of times the corresponding (i+1)-th file has been visited).

The (i+1)-th regions are preferably arranged along a path (e.g. within the corresponding i-th region) which is continuous (e.g the path is independent of the number of (i+1)-th regions to be displayed) and closed, or a path which is discrete (e.g. for each possible number of (i+1)-th regions up to a maximum, there is a predefined arrangement of that number of (i+1)-th regions). For example, in some embodiments, some or all of the regions are circular, and in this case the (i+1)-th regions may be circular regions arranged around the inner periphery of the circular i-th region, touching the outside of the i-th region and with each (i+1)-th region touching or proximate to two neighbouring (i+1)-th regions. This is an example of a closed continuous path.

A property related to, but logically distinct from, the arrangement of the regions (described above), is here referred to as "angular invariance", and is a preferred feature of all maps drawn according to the invention. "angular invariance" means that for all i (or at least for i within a certain range) the arrangement of the (i+1)-th region(s) in spatial relationship to the corresponding i+th region is independent of the value of i (neglecting distance scales). This feature means that if the map is redrawn using a data file other than the first file in place of the first file, the result is a second map which is (e.g. substantially) a magnification of the part of the first map corresponding to the first file.

For example, suppose that a first map includes a second region (representing file "A"), and that there are a number of files "B" logically related to file "A" and therefore drawn as third regions in the first map. If the map is re-drawn treating "file A" as the first data file, the spatial arrangement of the new second regions (i.e. the regions representing the files B) is equivalent to the spatial arrangement of the regions representing files B in the first map. Similarly, the fourth regions in the first map representing files logically related to the files B, are transformed into third regions in the second map, but maintain their relative spatial arrangement and/or shape. And so on. In summary, the part of the first map which is the second region representing file A, and all (or most) regions spatially related to that second region, and all (or most) files spatially related to them, are expanded, but not relatively rearranged. That is, although the size of the regions respectively representing the files B is changed, and the distance between those regions is changed accordingly, the angular relationship between them (and preferably also between them and the region representing file A) is invariant.

Angular invariance may include invariance ("directional invariance") in relation to a predefined direction in the map (e.g. the horizontal axis of the screen) so that the relative angular locations of the (i+1)-th regions in the second map in relation to the predetermined direction are the same as their angular locations in the first map relative to the predetermined direction (e.g. if one imagines a polygon having as its vertices the centres of the (i+1)-th regions, that polygon is magnified and displaced in the second map but is substantially not deformed, and substantially not rotated relative to the predefined direction).

Angular invariance (especially in the case of directional invariance) has the technical advantage that redrawing of the map starting from a particular descendant redraws that region and its descendants in the same way (e.g. substantially) as they would have been if the part of the original map comprising that region and its descendent been simply magnified (scaled up). This prevents a user of the map being disorientated by the transformation.

This concept constitutes an independent fourth aspect of the present invention, freely combinable with any of the features described above, which is a method of mapping logical relations between a plurality of data files comprising:

a step of, for a first file, in a display area displaying a first region and, one or more second regions, said second regions respectively representing one or more second files logically related to the first file, being spatially arranged in a two-dimensional formation in relation to the first region, and being spatially arranged relative to each other with an angular relationship determined by a rule, and (n−1) further steps, i=2, . . . , n, of, for the or each i-th file, displaying one or more (i+1)-th regions, said (i+1)-th regions respectively representing one or more (i+1)-th files which are logically related to the i-th file, being spatially arranged in a two-dimensional formation in relation to the i-th region, and being spatially arranged relative to each other with an angular relationship determined by said rule.

Preferably, the rule is in relation to a predefined direction in the map, the relative angular locations of the (i+1)-th regions in relation to the predetermined direction being substantially independent of i (whereby the map is directionally invariant).

Alternatively, in an expression based on "directional invariance", this aspect can be stated as a method of mapping logical relations between a plurality of data files comprising:

a step of, for a first file, in a display area displaying a first region and one or more second regions, said second regions respectively representing one or more second files logically related to the first file and being spatially arranged in relation to the first region, second regions being drawn according to a first distance scale but their relative orientation being independent of the first distance scale; and (n−1) further steps, i=2, . . . , n, of, for the or each i-th file, displaying one or more (i+1)-th regions, said (i+1)-th regions respectively representing one or more (i+1)-th files which are logically related to the i-th file, and being spatially arranged in relation to the i-th region representing that i-th file, said second regions being e.g. according to an i-th distance scale smaller than the (i−1)-th distance scale but their relative orientation being substantially independent of the i-th distance scale.

In either case, the rule may be dependent upon the number of regions to be arranged, but is substantially not dependent upon the distance scales (i.e. the value of i). As in other aspects of the invention, the distance scales are preferably used to define sizes of the regions.

Note that to define the angular relationships of two regions clearly and unambiguously, it is helpful to define an "origin" point in each region, and state that the angular relationship of two regions is used to mean the angular relationships of the respective "origin" points. The "origin" point may be unambiguously defined in any of a number of ways, for example (i) the centre of gravity of the regions, (ii) the centre of gravity of a convex hull around the regions, or (iii) in the case that the regions are of a predefined shape and orientation a pre-defined position on the regions (e.g. bottom left-hand corner). Note that the concept of a two-dimensional arrangement of regions can also be defined as one in which the centres of the regions are not all on a straight line in the map.

Further preferred features of the map (in any of the aspects) are that:

1) At least one (preferably most, more preferably all) region(s) (other that the starting area) (and preferably also its children, and more preferably also its descendants) do not change shape if the map is redrawn with that region as the starting point ("morphic invariance"). This feature makes it very much easier to "zoom into" (or out of) the map, without losing orientation. It is especially advantageous in combination with the angular and directional invariances.

2) The siblings (and in addition in order of preference the parent, ancestors, children and/or descendants) of the region representing a given file do not change shape if the map is redrawn omitting that region map is redrawn ("stability"). This is useful, for example, in the case that while a map is in use a new data file is added or subtracted from the network or directory, and also in the case of certain of the maps described below in which there is the option of re-drawing a map without a certain file being represented.

3) The children ((i+1)-th files) of at least one (preferably most or every) i-th file are laid out along a continuous closed path (e.g. a closed loop around the periphery of the i-th region) or sequentially at a finite number of predetermined ordered positions (e.g. in positions corresponding to the keys one to nine on a standard 3×3 numeric keyboard). This is a highly preferred feature of maps according to the invention.

4) The area of the map representing a given i-th region (excluding the total areas representing all its children and their descendants) is at least half as large as, preferably at least as large as (for example at least twice as large as) the area representing any one of its children and that child's descendants ("perspective"). This feature makes it easy to indicate (e.g. by clicking) any one of the i-th regions at any level, and it in contrast to the tree map in which the region representing a given directory is usually fully tiled by its descendants.

These four desiderata allow the invention to be expressed in alternative manners (as below), to describe methods of drawing the map such that the desired behaviour above is obtained when the same method is used to re-draw the map (e.g. starting from a different starting point, or with one or more data files added or removed from the set to be mapped.)

Thus, an alternative expression of the invention is a method of mapping logical relations between a plurality of data files comprising:

a step of, for a first file, in a display area displaying a first region and one or more second regions, said second regions respectively representing one or more second files logically related to the first file and being spatially related to the first region, the sizes of said second regions being according to a first distance scale, and the shape of said second regions being determined by a rule; and for a predetermined value of n, (n−1) further steps, i=2, . . . , n, of, for the or each i-th file, displaying one or more (i+1)-th regions, said (i+1)-th regions respectively representing one or more (i+1)-th files which are logically related to the i-th file, and being spatially related to the i-th region representing that i-th file, the sizes of said (i+1)-th regions being according to an i-th distance scale smaller than the (i−1)-th distance scale, and the shapes of said (i+1)-th regions being determined by said rule, said rule being independent of i and/or the number of said (i+1)-th regions.

The first of these possibilities (independence of i) corresponds to morphic invariance. The second possibility (independence of the number of (i+1)-th regions) corresponds to stability. Preferably, the shapes are (substantially) independent of both i and the number of (i+1)-th regions.

Thus, an alternative expression of the invention is a method of mapping logical relations between a plurality of data files comprising:

a step of, for a first file, in a display area displaying a first region and, for M an integer greater than one and q an integer in the range 1, ... M, q second regions, said second regions respectively representing one or more second files logically related to the first file, being arranged in relation to the first region, having a relative angular relationship according to the first q positions of a predefined sequence of M predetermined positions.

(n−1) further steps, i=2, ..., n, of, for the or each i-th file, for $q_i$ an integer in the range 1, ..., M displaying $q_i$ (i+1)-th regions, said (i+1)-th regions respectively representing one or more (i+1)-th files which are logically related to the i-th file, being arranged in relation to the i-rh region, and having a relative angular relationship according to the first $q_i$ positions of said sequence of predetermined positions.

This feature reduces the risk of a user being disorientated after a re-drawing of the map, or when a file is added or removed from the map. It is particularly useful in the case that the positions correspond to an arrangement of keys (or other indicator devices) used to indicate on of the regions (e.g. part of the device which produces a display according to the method).

For example, it is convenient in a device (such as a mobile telephone) having a standard 3×3 numeric keypad, that there may be M=8 predefined positions, corresponding to the 9 points of a numeric keypad (omitting 5), and the sequence of positions is the sequence 1, 2, 3, 6, 9, 8, 7, 4 (that is a clockwise path along the outside of the keypad grid).

Although, as explained above, in any aspect of the invention it is possible for all the (i+1)-th regions to be according to the same (i-th) distance scale even if they are descendants of different i-th files (e.g. to have exactly or approximately the same diameter), this is not a necessary feature of any aspect of the invention. Rather, (i+1)-th regions representing files logically related to different i-th files may have different (or even unrelated) sizes. That is, the i-th distance scale may be different for different respective i-th files. However, in this case too the area of the regions preferably has the boundedness property, and more preferably the intensiveness property, discussed above.

The user may have the option of redefining any of the rules determining the shape of the regions and for their size and/or their arrangement within the display. For example, he may have the option of changing between circular regions and regions of any other shape, such as squares.

It is also possible that the rules of shape and/or arrangement of the i-th regions depend on i, e.g. to be different for i=n, or to be dependent upon some other factor. For example, if the regions are circular for all i up to n−1, the n-th regions may be chosen to be complementary sectors of the corresponding (n−1)-th regions. Furthermore, the (i+1)-th regions for different i-th files may be respectively of different shapes.

Optionally, the methods may not display regions for all the (i+1)-th files logically related to the i-th file, but may neglect certain of those files, for example according to one or more predefined or re-definable criteria.

For example, it is possible that a hyperlink from a first file leads to a second file, and that a hyperlink from that second file leads back to the first file, so that first file is in a sense also a third file. In this case, the methods may not display the first file as a third region. As a second example, often a given third file can be reached from the first file in two clicks via two different second files. The methods may in this case display only one third region, in or near only one of the two possible second regions. In other words, the method may include steps of determining if regions corresponding to i-th files have already (for equal or smaller i) been displayed, and modifying the display accordingly.

A further possibility is for there to be a predetermined (e.g. selectable by the user) maximum number of (i+1)-th regions displayed for each i-th region. For example, if there are more than a predetermined number M of (i+1)-th data files logically related to a given i-th file, the method may only display M (i+1)-th regions, respectively representing only M of those (i+1)-th files. For example, if the i-th region was a square, the method might only display eight square (i+1) regions, arranged along a square path along the internal periphery of the i-th region.

The map may include one or more (or even all) region drawn which do not represent a single respective file in the original data structure, but rather represent collections (or even collections of collections) of (i+1)-th files. For example, if there were 15 (i+1)-th files to be mapped in the example given above then seven (i+1)-th regions may represent seven of the (i+1)-th files and an eighth region may represent the remaining eight (i+1)-th files, and have drawn within it eight regions respectively representing the eight remaining (i+1)-th files. Alternatively, as a second example, if there were say 64 (i+1)-th files to be represented, the eight (i+1)-th regions may alternatively each represent eight of those (i+1)-files (i.e. the first (i+1)-th region the first eight (i+1)-th files, the second (i+1)-th region the second eight (i+1)-th files, and so on).

A user can use a display produced according to the invention to map the part of the web near his current location (for example for navigating within the web). Suppose, for example, that the user has just changed his location in his (system or net) browser to read a given file. He may then have an option, for example by performing a certain mouse click, of causing his terminal to perform the method of the invention described above, using the file the user is reading as the first file, to generate a map of the files up to n clicks away. This would immediately tell him, for example, about the number of files a given number of clicks from his present location, and could allow him to open quickly any one of them into his browser (e.g. by clicking his mouse on the relevant region).

Indeed, a method according to the first, second, third or fourth aspect of the invention is preferably performed automatically whenever the user's location changes.

If the user wants more detail, he may have the option of selecting a certain file, for example by moving his mouse to a region of the display which represents that file, and causing the terminal to perform the method of the invention described above again, thus generating a display using his selected file as the first file. The user's terminal may be arranged to display also a path (or paths) (and/or a distance) between the user's location and the selected first file. For example, it may display a path (and/or distance) which is as short as possible.

The user may have the option of labelling a given file, for example to allow him to easily return to it later. This operation is analogous to inserting a bookmark into a conventional book. In this case, the user may be able to label his actual location within the web, the current first file (i.e. the first file on which the map of the web currently being displayed is based), or a file selected from the display by selecting a respective region. The way in which a region is displayed may indicate whether the file it represents has been labelled in this way, for example a labelled region may flash.

The methods of the invention expressed above may further include displaying characteristics of the files represented by the some or all of the regions, so as to facilitate navigation of the web or other file structure.

For example, the regions may be displayed in a colour which indicates a characteristic of the corresponding file, for example the site of a given file, or the server which provides it.

Furthermore, the user may be able to call up or have displayed automatically further information on a file using the corresponding region, for example by moving his mouse to that region on the display and perhaps additionally performing a mouse clicking operation. This could cause information to be displayed, such as the title of the file. The user might also be able to call up further information, for example by a different or more complex mouse clicking operation. This more detailed information may be displayed in a part of the display outside the first region, for example as a separate box displayed to the user in a different part of the screen. The more detailed information might for example include any combination of the title of the file, its address, a precis of it, or details of the specification of the file (e.g. technical information including the data format of, say, images referenced in the file).

The information which is displayed by the method of the invention, such as the existence of the files which can be reached by any number of clicks, together with any characteristics of those files, may be derived at the time when the methods according to the invention described above is performed (i.e. as additional steps in that method). Alternatively, it may be pre-generated, for example during times in which the apparatus is idle, so that it is immediately available, when the mapping method is performed.

The method may include a step of storing the information, so that it can be recalled if a user returns to this section of the web. The storage could for example be in a location accessible only to one user (e.g. on a user's device), or in a location accessible by several users. The data stored may be collected and maintained on the basis of the movements of one or more than one of the users, or one some other basis, such as maintaining an up-to-date map of the pages in a particular site, or those stored one or more than one server. The collection may be performed on request or automatically by one or more (e.g. spatially separated) devices. For instance each collection device might be located on the server whose information it collects. In this and similar cases there would normally be a step of collating the information collected by distinct devices.

Such stored information could be automatically removed, for example after a predetermined period, if the user has not returned (or if no user has returned) to that area of the hyperspace. Alternatively, if a user accesses a particular area of the web frequently, the information concerning that section of the web could be stored such that it will not be discarded. If the web subsequently changes in that location, for example due to the addition of a new file or a new anchor, the stored information could be updated, or regenerated, accordingly.

Although, as explained above, the feature of the gradually decreasing distance scales with increasing i, and the feature of boundedness of the map (and optionally also the intensiveness of the map), are particularly suitable for the display of a hyperspace, they are not essential to the invention. The invention may alternatively be expressed in terms of mapping a set of data files defined according to a user's current location, and facilitating movement between the files.

Accordingly, a fifth aspect of the invention is a method of moving between data files comprising the steps of:
  generating a display of the interconnections between the data files by:
    a step of, for a first file, in a display area displaying a first region and one or more second regions, which respectively represent one or more second files logically related to the first file, and which are spatially related to the first region, the sizes of said second regions being according to a first distance scale; and
    (n–1) further steps, i=2, ..., n, of, for the or each i-th file, displaying one or more (i+1)-th regions, which respectively represent one or more (i+1)-th files which are logically related to the i-th file, and which are spatially related to the i-th region representing that i-th file, the sizes of said (i+1)-th regions being according to an i-th distance scale smaller that the (i–1)-th distance scale;
  selecting a file on the basis of the display; and
  moving to the selected file. Moving to that file may be by issuing an instruction, for example by clicking a mouse on the region of the display corresponding to the selected file.

The term "moving to a data file" is used in this document to imply that a user can obtain a least some information concerning the file. For example, it includes the user registering an interest in a particular file, in response to which the method generates at least some information concerning the file, such as its title or a precis. The term "moving" further includes within it "opening" a file, that is to say obtaining full information from a file (e.g. in conjunction with another program). Preferably, in all aspects of the invention when the user has the option of obtaining information about a given file, he or she also has the option of opening it.

In the case of a file which stores data for interacting with an application (e.g. a graphics file may contain data in a format such that the graphics file can be opened by a graphics program; a Word file can be opened by the word processor Word; etc.), "opening" includes transferring the data in that data file to the compatible application, so that the user (or another user) can access the data in the data file via the application.

Thus, the user may be able to move to any data file. For example, in the case that the data files are a directory structure, the user may be able to move to any directory of the directory structure and to any leaf node. The user preferably has the option of opening that file.

In addition to the map produced by any aspect of the invention, the display area may include a further portion having a plurality of areas each corresponding to a respective one of the regions of the map (for example, an area for each of the (i+1)-th regions which logically related to a given i-th region). Preferably these areas have a relative geometrical relationship which corresponds to the relative geometrical relationship of the areas they represent, but they may not (e.g. these areas may be arranged in a column). The areas may be marked in a way which indicates the significance of the corresponding region (e.g. with appropriate icons). In the case of the fifth aspect of the invention, the selection of a certain data file may be by a motion in relation to a respective area (e.g. clicking on an area may open the data file represented by the region corresponding to the area).

A sixth aspect of the invention is a method of displaying interconnections between a plurality of data files comprising, upon a user's location changing to correspond to a first file:
  a step of, for the first file, in a display area displaying a first region and one or more second regions, which respectively represent one or more second files logically related to the first file, and which are spatially related to the first region; and
  (n–1) further steps, i=2, ..., n, of, for the or each i-th file, displaying one or more (i+1)-th regions, which respectively represent one or more (i+1)-th files which are logically related to the i-th file, and which are spatially related to the i-th region representing that i-th files.

Thus, the display may be "automatically" updated as the user moves through the hyperspace.

Preferably, in methods according to the sixth aspect of the invention, the regions are generated according to a distance scales which decrease for increasing i, as described above in relation to the first and second aspects of the invention (e.g. with decreasing sizes of the regions and/or with the map being drawn up to a predetermined n). Preferably too, in methods according to the fifth or sixth aspects of the invention, the regions have the boundedness property (and optionally the intensiveness property) described above.

All the methods described above may include the further step of generating a second map, to be displayed at the same time as the maps described above. For example, if the user is displaying a map generated as described above using a certain file as the first file, the method may include generating a second map showing other files related to that certain file. In some embodiments, for example, if the first file was reached by selecting a file from a map generated as described above, the second map may represent (e.g. as respective regions) the files of that map which the user did not select.

The second map increases the dimensionality of the entire display. For example, the user can see along directions of the hyperspace which he did not select, and/or "backwards" to files to which the first file is logically related.

Although the above aspects of the invention, refer to a "plurality" of files, methods according to any of the above aspects of the invention may alternatively, or additionally, map interconnections between a plurality of portions of one or more (e.g. large) files. In this case the logical connections are links between the portions of the file. For example, if a single large file contains a diary representing a plurality of days, the method may be used to map logical relationships (cross-references) between the days. In other words, although in some forms of the invention the data files are separate (e.g. electronic files provided on different respective servers and/or files related only by the logical interconnections), one or more of the plurality of files referred to in the above aspects of the invention may alternatively be respective portion(s) of a larger data file (or files). For example, it should be understood that in the sixth aspect of the invention, the term "moving between data files" should be understood to include not only moving between data files which are separate (e.g. which are provided on different servers) but also data files which are themselves part of a single larger data file.

Accordingly, in a seventh aspect the invention provides a method of mapping interconnections between a plurality of segments of one or more data files, comprising:

a step of, for a first segment, in a display area displaying a first region and one or more second regions, which respectively represent one or more second segments logically related to the first segment, and which are spatially related to the first region; and (n−1) further steps, i=2, ..., n, of for the or each i-th portion of the file displaying one or more (i+1)-th regions, which respectively represent one or more (i+1)-th segments which are logically related to the i-th segment, and which are spatially related to the i-th region representing that i-th segment.

The invention in this aspect is combinable with any of the other aspects described above, so that for example any one of more of the following may apply:

1) The i-th regions are formed on an i-th distance scale, greater than an (i+1)-th distance scale on which the (i+1)-regions are formed. This distance scale may characterise the size of the regions.

2) The map is such that the total area of the regions (the sum of all points which are contained in at least one of the regions) is bounded (i.e. less than a predetermined value) irrespective of n (and optionally intensive, that is independent of n).

3) The method is used for moving to a portion of the file, by the user indicating (e.g. with a mouse) the corresponding region of the map.

The segments may, for example, represent portions of a structural item of computer language (e.g. a program) in any programming (or content presentation) language, stored across one or more data files, and the logical relationships may be the conceptual structure of the item (e.g. which portion of a program "calls" which other).

Although it is preferred within the terms of the invention that the regions are drawn on a user's screen, an alternative is for the regions merely to be "sensitive" areas on a screen which are not necessarily drawn. A user can then cause an effect merely by indicating a point on the screen.

Thus, in an eighth aspect, the invention provides a method of moving to a data file, said data file being one of a plurality of data files related by logical relations, the method comprising:

a step of, for a first file, in a display area defining a first region and one or more second regions, said second regions respectively representing one or more second files logically related to the first file and being spatially related to the first region, the sizes of said second regions being according to a first distance scale;

for a predetermined value of n, (n−1) further steps, i=2, ..., n, of, for the or each i-th file, defining one or more (i+1)-th regions, said (i+1)-th regions respectively representing one or more (i+1)-th files which are logically related to the i-th file, and being spatially related to the i-th region representing that i-th file, the sizes of said (i+1)-th regions being according to an i-th distance scale smaller than the (i−1)-th distance scale;

indicating (e.g. by a mouse) a position on said display area within one of said defined regions; and moving to the file represented by the region containing said position.

All features of the geometrical properties of the regions described above in relation to the other aspects of the invention apply to these aspects also. Preferably, the user is displayed information informing him which region his pointer (mouse) is pointing to at any moment (and more preferably he is informed of the identity of that region's parent and/or siblings and/or children, e.g. as described below), so that he can indicate quickly and easily when the pointer is in a region corresponding to a file in which he or she is interested.

The next three aspects of the invention share the general principle of generating further information and/or regions associated with a selected subset of the files, e.g. the children of a certain data file.

The ninth aspect of the invention proposes, in general terms, that a representation (a "control pad") is generated by a user to indicate the existence of a set of siblings, and the user uses this representation to move to a file. Optionally, the representation may include information on the siblings.

Specifically, a ninth aspect of the invention is a method of moving to a data file comprising the steps of:

generating a display of the interconnections between a plurality of data files by:

a step of, for a first file, in a display area displaying a first region and one or more second regions, which respectively represent one or more second files logically related to the first file, and which are spatially related to the first region; and (n−1) further steps, i=2, . . . , n, of, for the or each i-th file, displaying one or more (i+1)-th regions, which respectively represent one or more (i+1)-th files which are logically related to the i-th file, and which are spatially related to the i-th region representing that i-th file;

for a selected (j)-th data file (1<j≦n) represented by one of said regions generating for each of said one or more (j+1)-th data files which are logically related to (j)-th file a respective additional region; and upon a user indicating a said respective additional region, moving to the corresponding data file.

Preferably, each additional region is representing showing data indicating the significance of the respective (j+1)-th file.

In a tenth aspect the invention proposes in general terms using an indicator device moving on a map as described above to trigger the display of information about a selected subset of files (i.e. without the map itself being redrawn). This concept further permits a novel method of operating an indicator device to move to a file based on a map according to the invention.

Specifically, in the tenth aspect the invention proposes a method of moving to a data file comprising the steps of:

generating a display of the interconnections between a plurality of data files by:

a step of, for a first file, in a display area displaying a first region and one or more second regions, which respectively represent one or more second files logically related to the first file, and which are spatially related to the first region; and (n−1) further steps, i=2, . . . n, of, for the or each i-th file, displaying one or more (i+1)-th regions, which respectively represent one or more (i+1)-th files which are logically related to the i-th file, and which are spatially related to the i-th region representing that i-th file; and upon said user controlling an indicator device so that a position within the map determined by the physical arrangement of said indicator device is within a said region representing a j-th data file generating for each of one or more data files which have a predetermined logical connection to the (j)-th file a respective additional region including data indicating the significance of said respective connected file.

Preferably, the predetermined logical connection is that the connected data files are children (i.e. (j+1)-th files) of the j-th file. Alternatively, they may be all the files to which the j-th file is logically related (e.g. all files from which the j-th file can be reached by one click).

Thus, the user may indicate a subset of the files (e.g. by a mouse pointer movement), and trigger the display of information about those files without the map being redrawn. The additional regions may only be displayed for a limited period of time (e.g. while the user presses a certain key).

The tenth aspect of the invention further permits a method of opening files, which is a method according to the ninth aspect of the invention further comprising an additional step of, upon the user supplying a control signal when the position determined by the physical arrangement of said indicator is a position corresponding to one of said (j+1)-th files, moving to said (j+1)-th file.

This may be termed a "sliding click". The user first indicates a position which causes significance data to be displayed about a subset of files (without the map being redrawn), and then on the basis of this data chooses (and indicates with the pointer) one of that subset of files.

In an eleventh aspect, the invention proposes that a map according to the invention is drawn up, and that the user is able to select one of the files (e.g. an (n+1)-th file) and generate a map of its descendants, including descendants which were not previously represented (i.e. reveal a "hidden layer" of descendants).

Specifically, in the eleventh aspect the invention proposes a method of displaying interconnections between a plurality of data files comprising the steps of:

generating a display of the interconnections between the data files by:

a step of, for a first file, in a display area displaying a first region and one or more second regions, which respectively represent one or more second files logically related to the first file, and which are spatially related to the first region; and (n−1) further steps, i=2, . . . , n, of, for the or each i-th file, displaying one or more (i+1)-th regions, which respectively represent one or more (i+1)-th files which are logically related to the i-th file, and which are spatially related to the i-th region representing that i-th file; and upon an user indicating a said j-th data file, generating for each of one or more (j+1)-th data files which are logically related to said j-th file and which had were not already represented, a respective additional region representing the (j+1)-th file.

The value of j may for example be equal to n+1, so that the revealed hidden layer is one layer beyond the deepest layer which had previously been represented on the map. Alternatively, the (j+1)-th files may be which had not previously been displayed according to any of the criteria discussed above (e.g. because the number of (j+1)-th files was above a predetermined value). The additional region(s) may be drawn as a continuation of the map (e.g. with the decreasing distance scales continued for one more level) (this possibility is especially convenient if j=n+1), or alternatively drawn differently, e.g. like labels as described above and below carrying information on the significance of the (j+1)-th files.

A twelth aspect of the invention is a device including display means such as a screen, and arranged to perform a method according to any of the first, second, third, fourth, fifth, sixth or seventh, eighth, ninth, tenth or eleventh aspects of the invention.

The device may be an item of consumer electronics, such as a portable device of any size ("micro" size such as a mobile telephone, "mini" size such as a personal digital assistant ("PDA"), or "macro" size, such as a laptop), a fixed installation, such as a PC, a digital TV, a kiosk, a public address device or a home network. It may be alternatively be fitted as a component of a consumer data network, e.g. in-flight entertainment on a plane, train, car, etc., or in relation to the world wide web as server side software, client side software or a custom site development. Furthermore, the device may be part of, give access to or facilitate the management of any other data collection or network which may for example be based on the functioning of a physical hardware network (satellite, telecom, cable or broadcast networks, traffic or data flow control systems, intranets or other private or proprietary networks such as Reuters, and data libraries such as Corbis) or may be a means of access to content (e.g. www sites, CD-ROMS, reference aids), or a component of task specific software (e.g. networked software, e-commerce software, menu or tool bars, data analysis tools) or hardware (e.g. for chip/circuit board layout).

In one embodiment, the device is a mobile telephone. The latest generation of mobile telephones includes both a memory (organised in a directory), (radio) access to a remote station where further information is stored, and the facility for accessing email and other internet systems. However, the usefulness of any of these facilities is severely limited by the size of the display device of a mobile telephone, which itself is limited by engineering constraints and present technology. By providing a mobile telephone with a display generated according to any of the methods of the invention defined above, the technical usefulness of the mobile telephone as an apparatus for transferring data is significantly enhanced.

Normally, the device will include a mechanism for the user to input data (instructions), for example a touch sensitive screen. Alternatively or additionally, it may include a mechanical data input device, such as a joystick or a plurality of keys. In this case, the arrangement of some or all of the regions, e.g. the additional regions of the control pad, preferably corresponds to the layout of the mechanical data input device.

For example, a mobile telephone may have buttons arranged in a keypad formation, and in this case the arrangement of the regions may correspond to the pattern of the keys.

For example, if there are nine keys in the keypad in a 3×3 array (in addition to any further keys which may be present), for each i-th region up to nine (i+1)-th regions may be arranged in a pattern corresponding to the positions of the keys (that is in a square 3×3 grid), or eight (i+1)-th regions might be laid along a (e.g. square) path along the periphery of the i-th region, e.g. corresponding to the position of eight of the nine keys. The usefulness of this arrangement is not limited to a mobile phone situation: the eight-fold arrangement also for instance makes it very easy for a user to select one of the regions (files) using a mechanical data input device such as an (octagonal) joystick or button mouse which is not (or not necessarily) part of a mobile telephone. The number of keys may thus be related to the value M of the maximum number of (i+1)-th regions displayed. If there are more than M (i+1)-th files logically related to the i-th file, the extra regions may be displayed separately (in a different area), or omitted (optionally symbol or symbols may be generated to indicate this and even give access to the omitted files).

A thirteenth aspect of the invention is a computer program product which can be read by a data processing device to cause the data processing device to perform a method according to any of the first, second, third, fourth, fifth, sixth, seventh, eighth, ninth, tenth, eleventh or twelfth aspects of the invention. The computer program product may be a computer program for implementing one of the methods of the invention stored on a recording medium, such as an electronically (or optically) readable recording medium.

By "low resolution screen" may be meant a screen with a low resolution in absolute terms (e.g. with no more than 500×500 pixels, no more than 200×200 pixels or even no more than 100×100 pixels) or one with a low resolution in relation to the number of files to be mapped (e.g. a total of no more than 10, 25 or 100 pixels per file).

In any of the aspects above, the method may be able to reject (i.e. not include in the map) files according to their type. For example, especially in the context of the web, the map may consistently ignore audio and/or picture files, so that a large click distance can be displayed without over-complicating the map, or may create an additional region to representing files (or containing files) of a certain (e.g. predefined) type.

Preferred embodiments of the invention will now be described for the sake of example only with reference to the accompanying figures in which.

Figure 9:
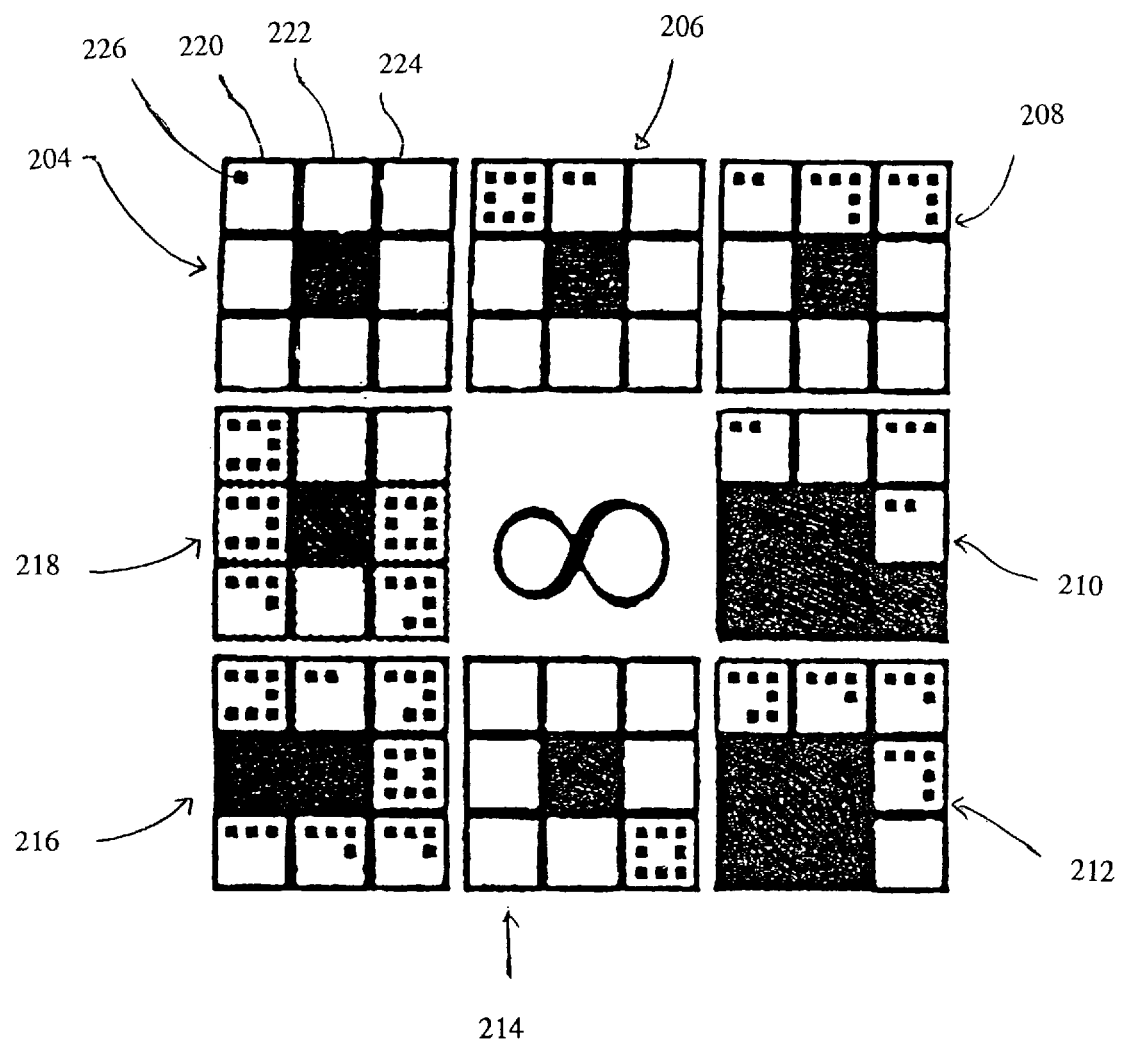
Figure 12:
Figure 13:
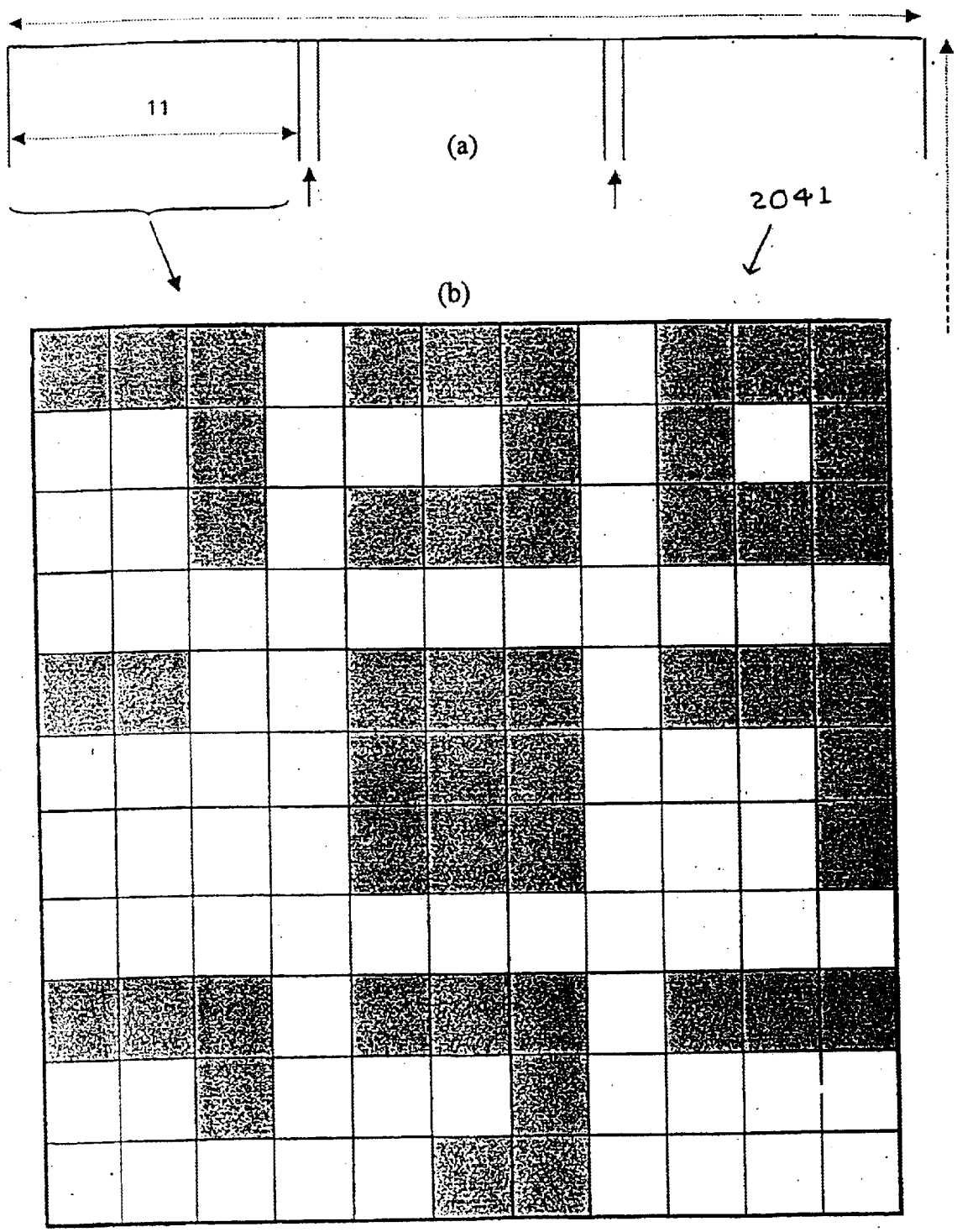
Figure 14:
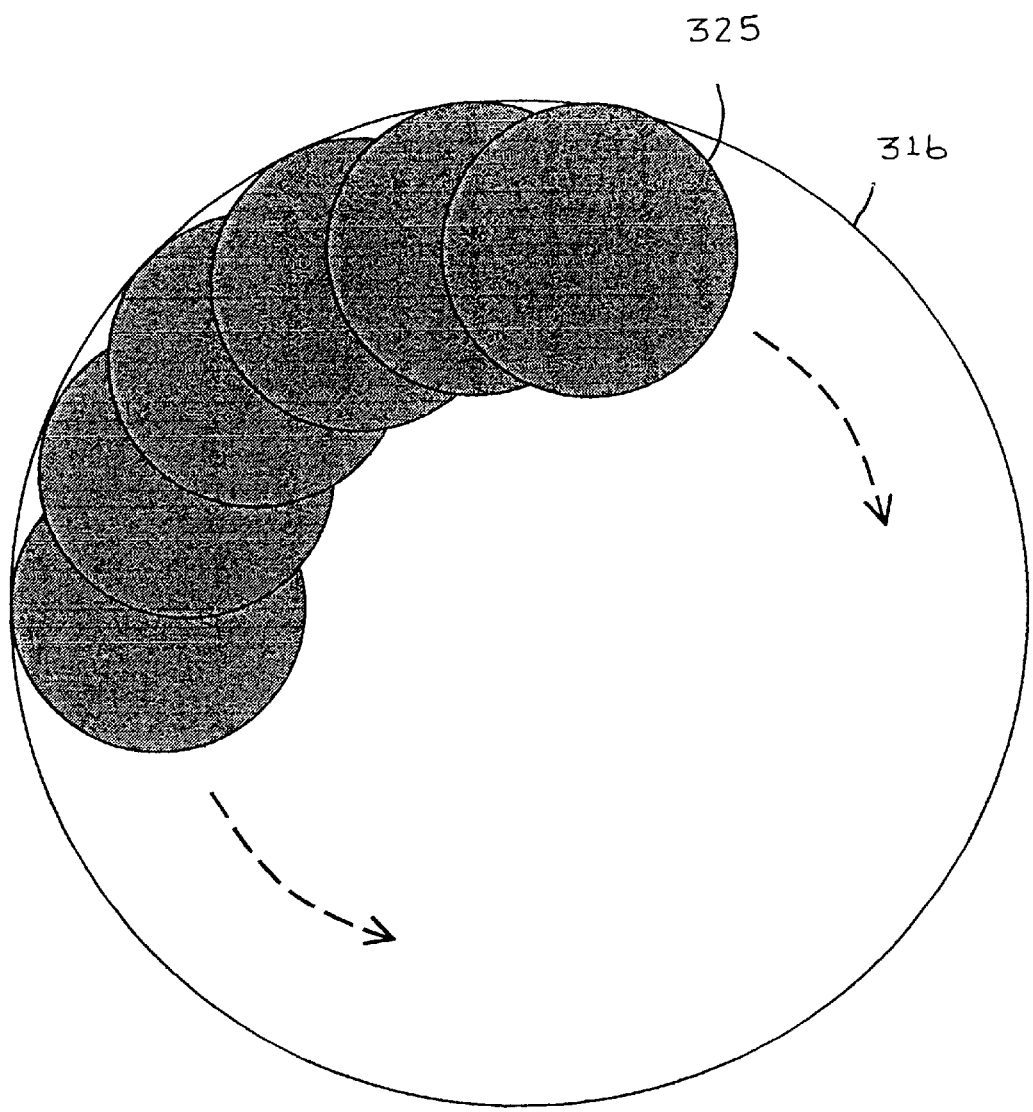
Figure 15:
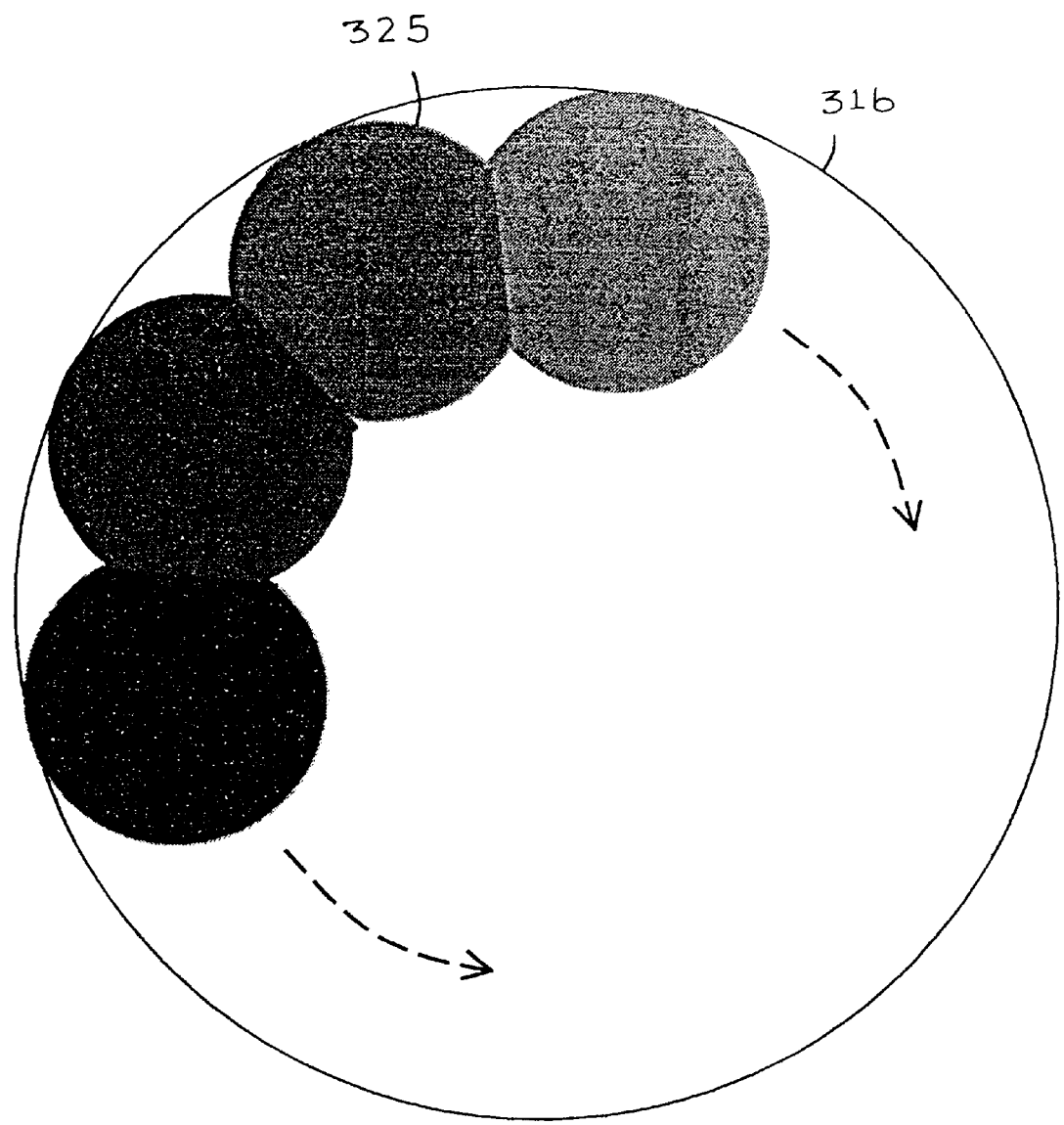
Figure 16:
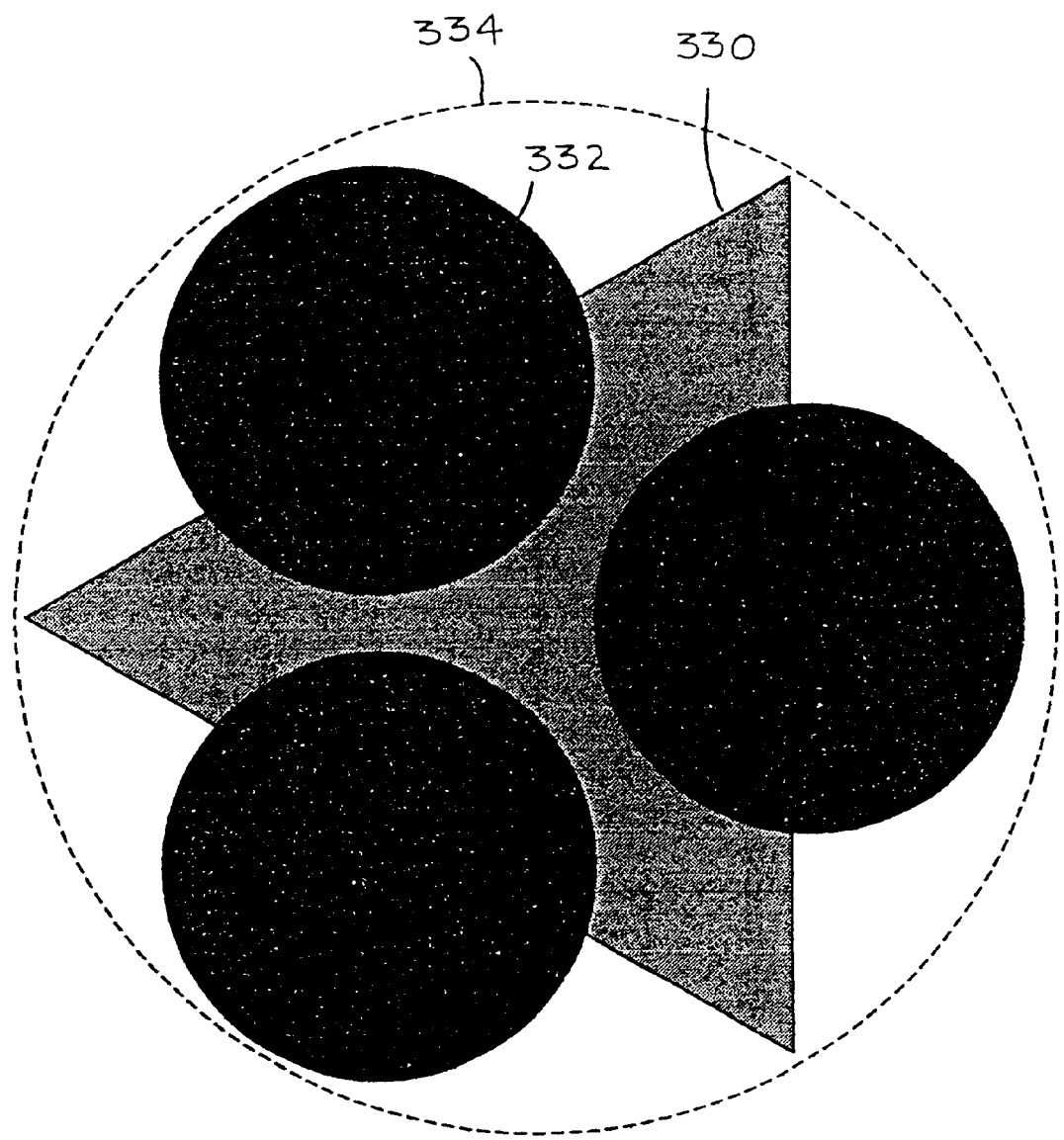
Figure 17:
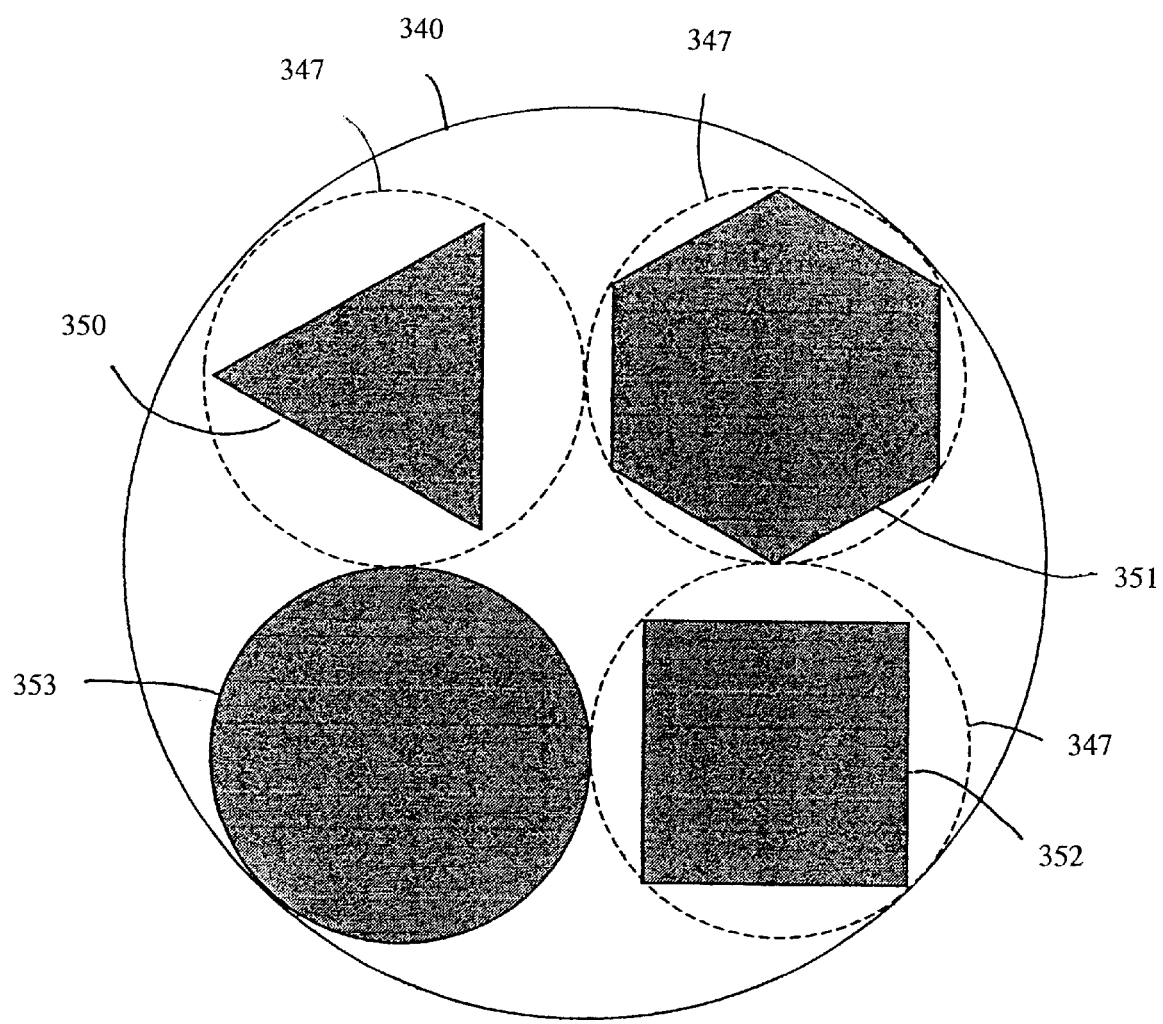
Figure 18:
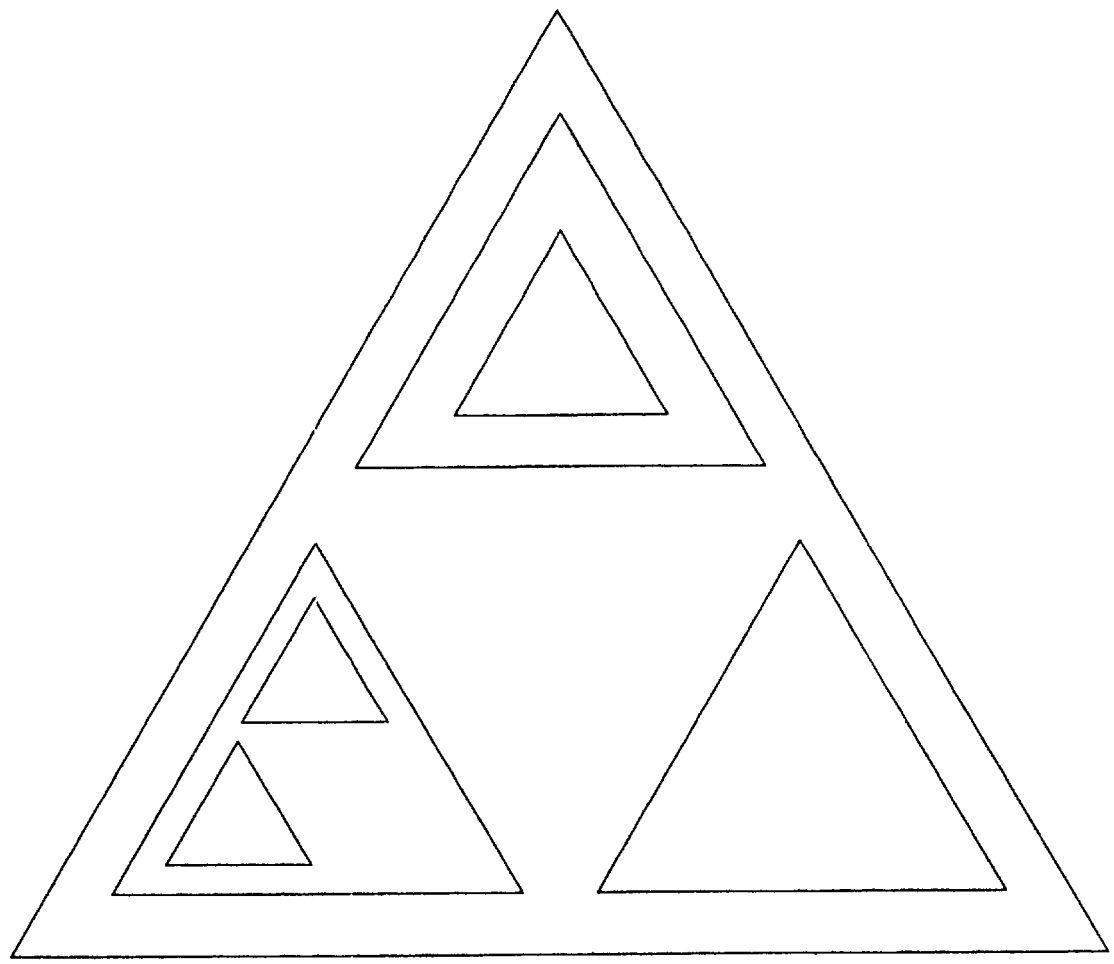
Figure 19:
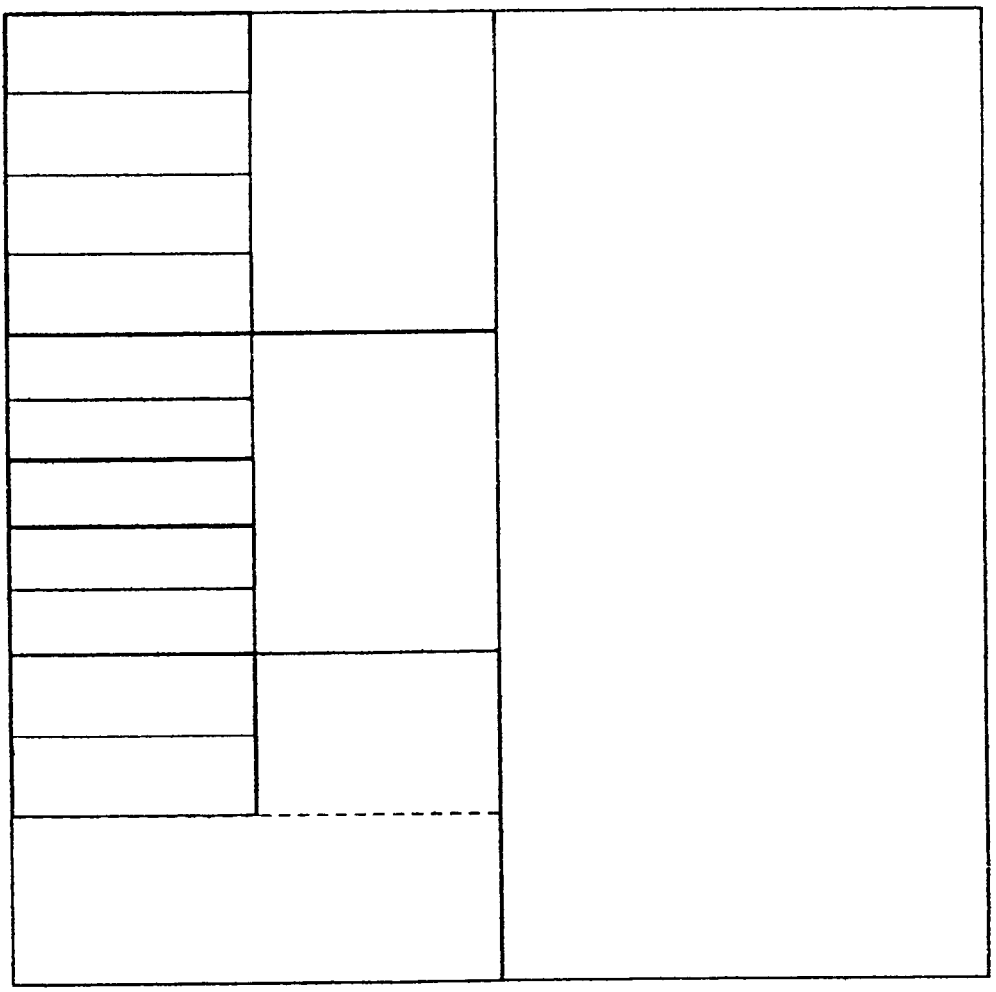
Figure 20:
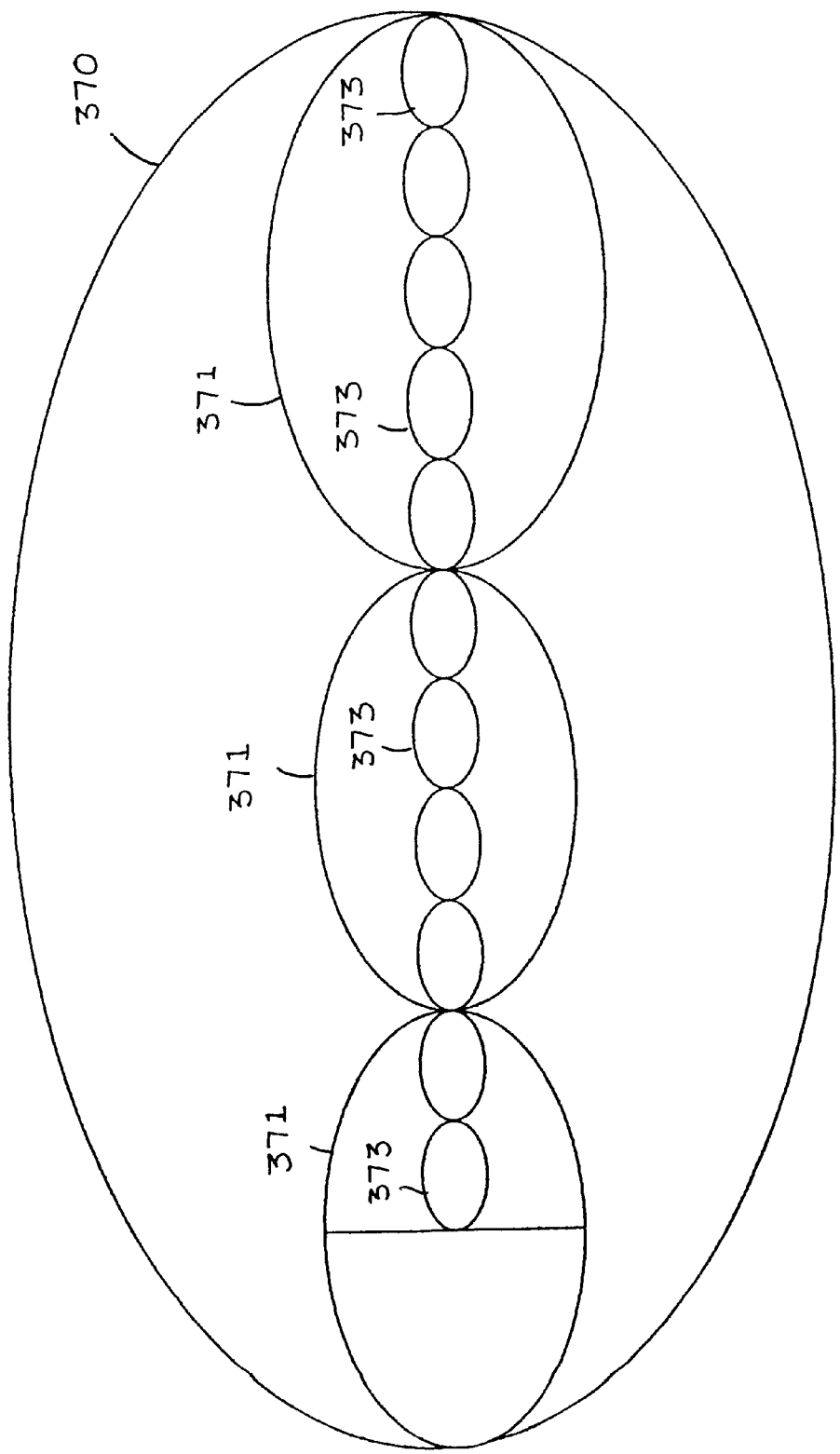
Figure 21:
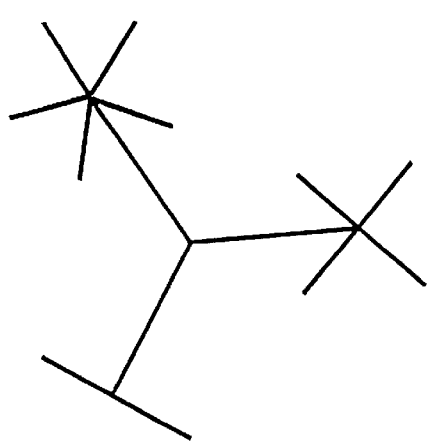
Figure 21:
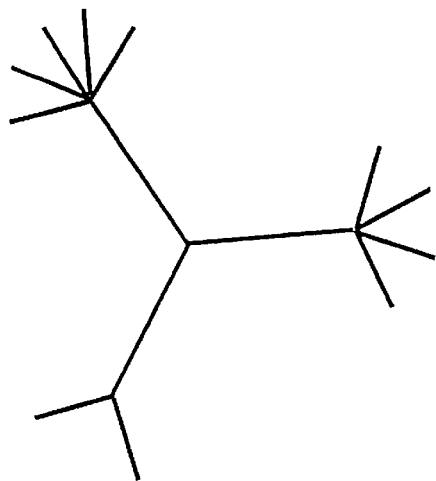
Figure 22:
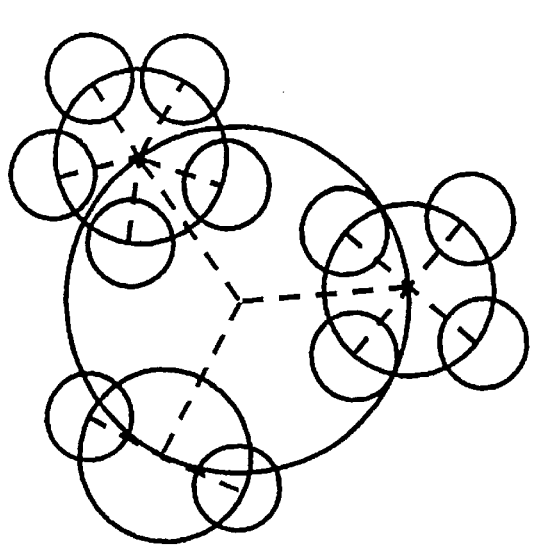
Figure 22:
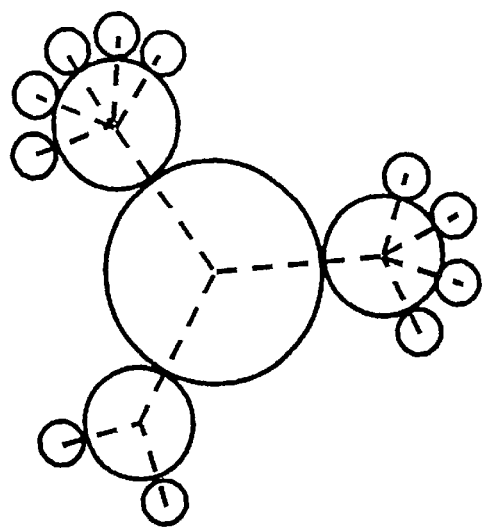
Figure 23:
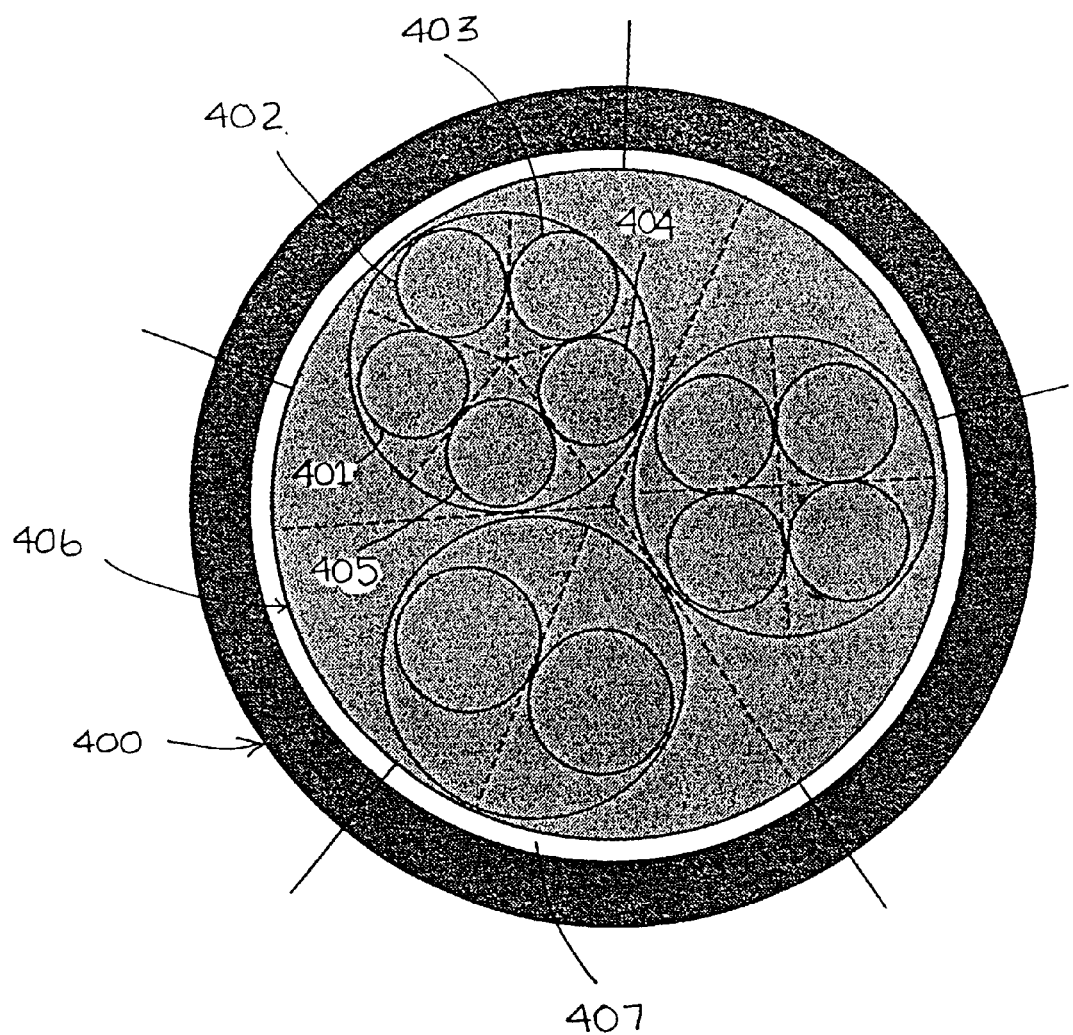

FIGS. 6(a)–(d) shows maps generated by a fifth method according to the invention;

FIGS. 7(a)–(c) shows the use of a map according to the invention for displaying 96 files in a directory structure;

FIGS. 8(a)–(c) shows three ways of displaying information characterising data files;

FIG. 9 shows a map produced by a method according to the invention and suitable for use in a mobile telephone;

FIGS. 10(a)–(j) shows how a mobile telephone equipped with the map of FIG. 9 can be used to make a telephone call;

FIG. 11 shows how a mobile telephone equipped with the map of FIG. 10 can be used to access a web;

FIG. 12 shows a mobile telephone according to the invention;

FIG. 13 shows schematically how a map for a telephone of FIG. 12 can be drawn according to the invention with a low resolution screen;

FIG. 14 shows schematically a portion of a map according to the invention;

FIG. 15 shows schematically a portion of another map according to the invention;

FIG. 16 shows schematically a portion of another map according to the invention;

FIG. 17 shows another map according to the invention;

FIG. 18 shows another map according to the invention;

FIG. 19 shows another map according to the invention;

FIG. 20 shows another map according to the invention;

FIGS. 21(a) and 21(b) show respective displays to a user which indicate respective (invisible) screen areas shown in FIG. 22; and FIG. 23 shows a further device according to the invention.

Figure 1:
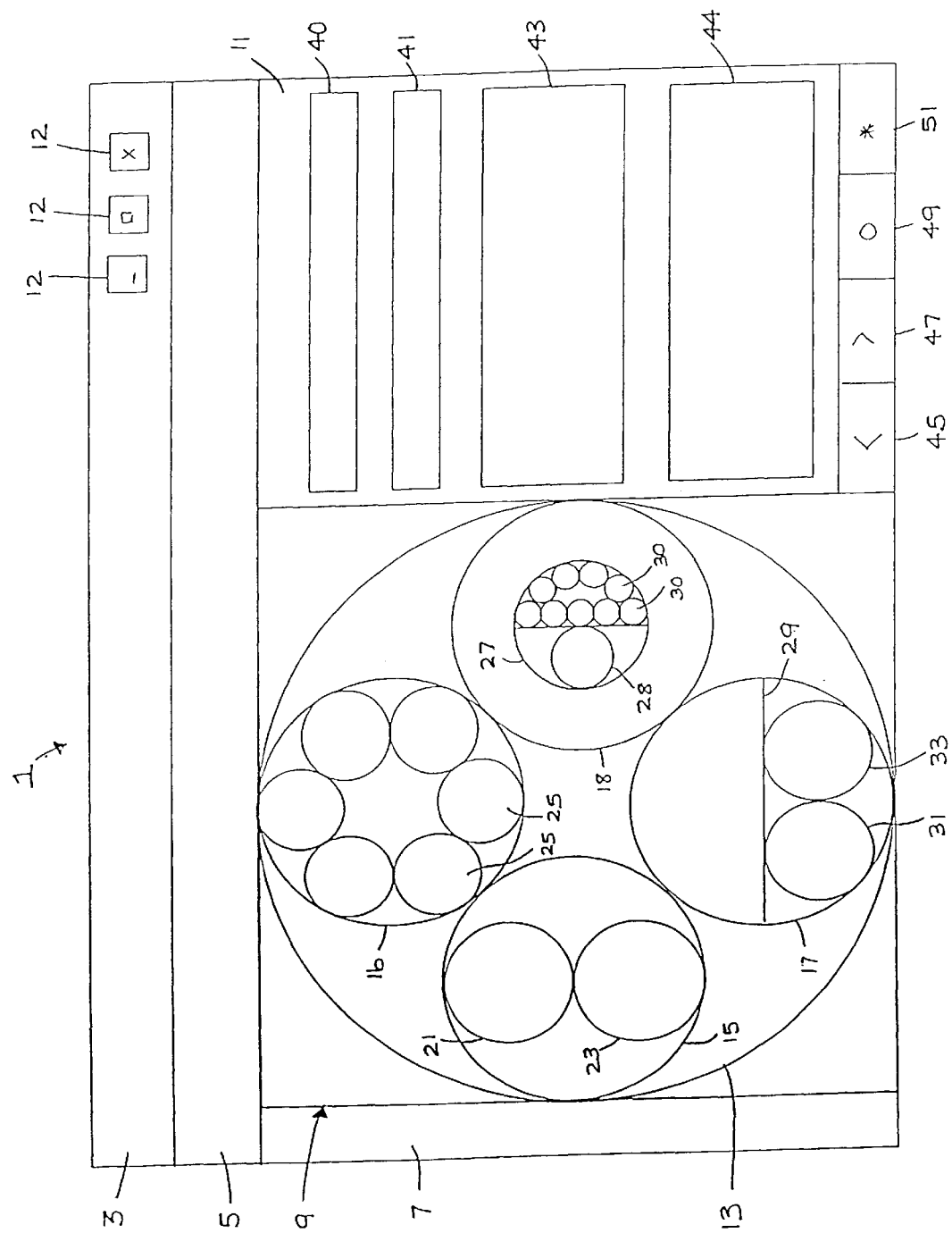
FIG. 1 shows a screen window including a map generated by a first method according to the invention.

FIG. 1 shows a window 1 having a title bar 3, a menu bar 5, a left bar 7, a display area 9 and an information display area 11. The title bar 3 includes buttons 12, that is to say areas of the screen responding to respective possible locations of a user's mouse, or other input device, such that by locating the mouse in those locations and performing a clicking operation the user can effect a control instruction to the apparatus. These buttons are used for window operations, such as opening and closing the window, in a conventional way. Similarly, the menu bar 5 allows the user to switch between various options and actions in a conventional way.

Display area 9 is shown containing a map generated by a method according to the invention. The method begins by defining a given file of the Internet as the "first" file, and draws a circular first region 13 which is as large as possible within the display area. The circular first region 13 represents the first file.

In this example, the first file is a page, and happens to contain four anchors, each of which leads to a respective "second" file. In the display the second files are represented by circular second regions 15, 16, 17 and 18. Second file 15 is a page containing two anchors, leading respectively to two third files, which are respectively represented in the display by the circular third regions 21, 23 within the second region 15 which represents that second file. Similarly, the second file represented by the circular second region 16 contains six anchors, and accordingly the circle 16 contains six respective circular third regions 25, each representing a respective one of the third regions. The second file represented by circular second region 17 is a "frame set", which partitions the browser array into two sections. In the map, this is represented by a horizontal line 29 which divides the circular region 17 into two halves. One of the two sections of the frame set does not contain any anchors, while the other section of the frame set contains two anchors, leading to respective third files which are represented on the display by the circular third regions 31, 33.

As mentioned above, the circular first region 13 is drawn to be as large as possible while remaining within the display area 9. Similarly, the second regions 15, 16, 17 and 18 are each drawn to be as large as possible while touching the perimeter of the first circular region 13, and each other. Similarly, the third circular regions 31, 33 within one section of the second circular region 17 are drawn to be as large as possible.

However, the second file represented by the second circular region 18 contains only a single anchor to a single third file. This third file is represented by a single circular region 27 which is concentric with the second circular region 18, but of half the radius. Thus, the third circular region 27 differs from the circular regions associated with other second files by not being maximally large consistent with lying within the circular second region 18. This means that for instance the map fulfills the fourth numbered preferred feature described above under the fourth aspect, and allows the user for instance to select a region with one click by positioning their mouse over the visible part of that region and performing a clicking motion.

The third file represented by the third circular region 27 is a frame set with two sections, a first section containing a single anchor, and a second section containing nine anchors. Accordingly, the third circular region 27 is divided into two by a line across its diameter, and one half is drawn to contain a single fourth circular region 28, while the other half of the third circular region 27 contains nine fourth circular regions 30 around its inner periphery.

In this display, it is chosen only to display fourth circular regions 28,30 within the third circular region 27. This may indicate that none of the other third circular regions is associated with a file containing any anchors. Alternatively, it may be the consequence of a map-drawing rule which requires for instance that fourth circular regions are only drawn within third circular regions which are the only third circular regions inside their respective second circular region.

Although not shown in this diagram, any of the regions described above may be of any shape (circles, ellipses, lenses, lozenge, triangle, square, pentagon, hexagon, etc.) and/or coloured, hatched, flashing, moving (e.g. spinning) and have symbols drawn inside them (e.g. squares or triangles)—possibly in such a way that those symbols dominate or are the only marks drawn in the map (see FIG. 17)—to indicate the server which the file is on, how recently it was last visited, whether it has been selected as the primary file, whether its title and precis information has been accessed, whether it is password protected, and/or whether it is a "page" or some other file type (e.g. an audio file or a leaf node).

One algorithm which generates the map of FIG. 1 (omitting for simplicity the possibility of "frame sets", which possibility could straightforwardly be taken into account by a skilled person) consists of the following five steps:

1. Draw a circle (first region) representing the first file as large as possible in the middle of the display area.
2. Count the number of links (anchors) N to other web pages in the page within the first file.
3. Representing the centre of the circle by the vector $\underline{P}$, and its radius by R, if N≠1, then around the inside edge of this circle draw circles which represent these N files, the new circles being in a ring each having radius (r) where $$r = R \sin(\pi/N)/(1+\sin(\pi/N))$$

and the centre of the new circle having a vector position ($\underline{p}$) is given by $$\underline{p} = \underline{P} + (R-r)\cos(2\pi l/N)\underline{x} + (R-r)\sin(2\pi l/N)\underline{y}$$

where $\underline{x}$ and $\underline{y}$ are unit vectors in the x and y directions, and l (l=1, ... N) counts the new circles.

If N=1, draw only one circle with $$r = R/2$$

$$\underline{p} = \underline{P}$$

4. Perform steps two and three for each of these new circles in turn.
5. Continue until the required level of detail is reached.

The information display area 11 contains information about the first file, such as its title (within box 40), its address (within box 41), a precis of the material it contains (within box 43), and (within box 44) a specification of the file (for example indicating whether or not the file displays or even is an image or video).

Of course, the world wide web contains many pages which are secure, in the sense that certain users are not permitted to access (e.g. secure pages for which a password or other identification is required). Even a directory structure inside a firm may contain such pages. In the case that the links inside a page are not public, the embodiment may draw a map based upon whatever information is available to it, for example a region indicating the existence of a page without any structure inside that region. The way the region is drawn may indicate that a page is secure. A user may be able to supply password or identification information to the embodiment, so that in the case of files which the user is in fact entitled to the see (even if the general public are not) the embodiment can interrogate the web site, server, etc to gain information about the secure page, and thus supplement the map. The embodiment may alternatively or additionally include a pre-written file of password or identification information, so that without intervention by the user it can obtain information about any data file which the user is entitled to look at.

Although not illustrated in FIG. 1, any or all of the circular regions may be graphically displayed, for example by colouring. This possibility is explained below in more detail in reference to FIG. 4.

Although in FIG. 1 for simplicity no regions beyond 3 clicks from the first file are shown n=3), in other embodiments files many clicks from the first file will be included to give a complex fractal picture including a total of up to several thousand regions. The method may even be performed continually (continuously or incrementally), based on a sequence of linked first files, to produce a zooming effect in which the user moves gradually through the web. Such a display may for example be used as a screen-saver.

One manner in which the window shown in FIG. 1 can be used will now be described. To begin with, the display may be generated when the browser is opened (e.g. automatically, or by a user's command) to generate a map based on a given first file (such as the file which he is presently reading). The display shown within display area 9 is then generated. This immediately indicates to the user how many anchors there are connecting his current file to others. Using an input device such as a mouse the user can indicate one of the regions in this display. For example, he may move the mouse until a cursor on the screen associated with the position of the mouse is over one of the regions. The display then indicates the title of the file corresponding to the selected region, for example as a text box near to the region. By a certain control command (such as a mouse click) the user may instruct the apparatus to generate further information based on the selected file. For example, the information in the display area 11 may be updated to be based on the selected file. If the user decides that to display that file ("open" the file), the user may issue a further control instruction to that effect (e.g. by a mouse click), so that file will be opened, either as a new window on the user's screen or as updating of the window which previously showed the first file.

A further command from the user (which may or may not be linked to actually opening the selected file) may regenerate the display based on the selected file as the first file. Alternatively, the display may be regenerated automatically whenever the user's location changes (either by the user moving as described above, or by inputting a new address into his browser).

Another possibility is for the user to attach a label (a "bookmark") to a particular file. This will allow him to automatically return to the particular file at a later time. A bookmark could be attached by a mouse command (i.e. by moving the cursor associated with a mouse to lie over a region which represents a file to be marked, and clicking the mouse buttons in an appropriate sequence) or in combination with one of the buttons 45, 47, 49, 51 located within the window 1.

A further possibility is for the user to regenerate the display based not upon his current location as a first file, but instead upon a file selected (for example) from the display. The regenerated display could then contain an indication of the click distance between the user's present location and the first file upon which the display is based.

Figure 2:
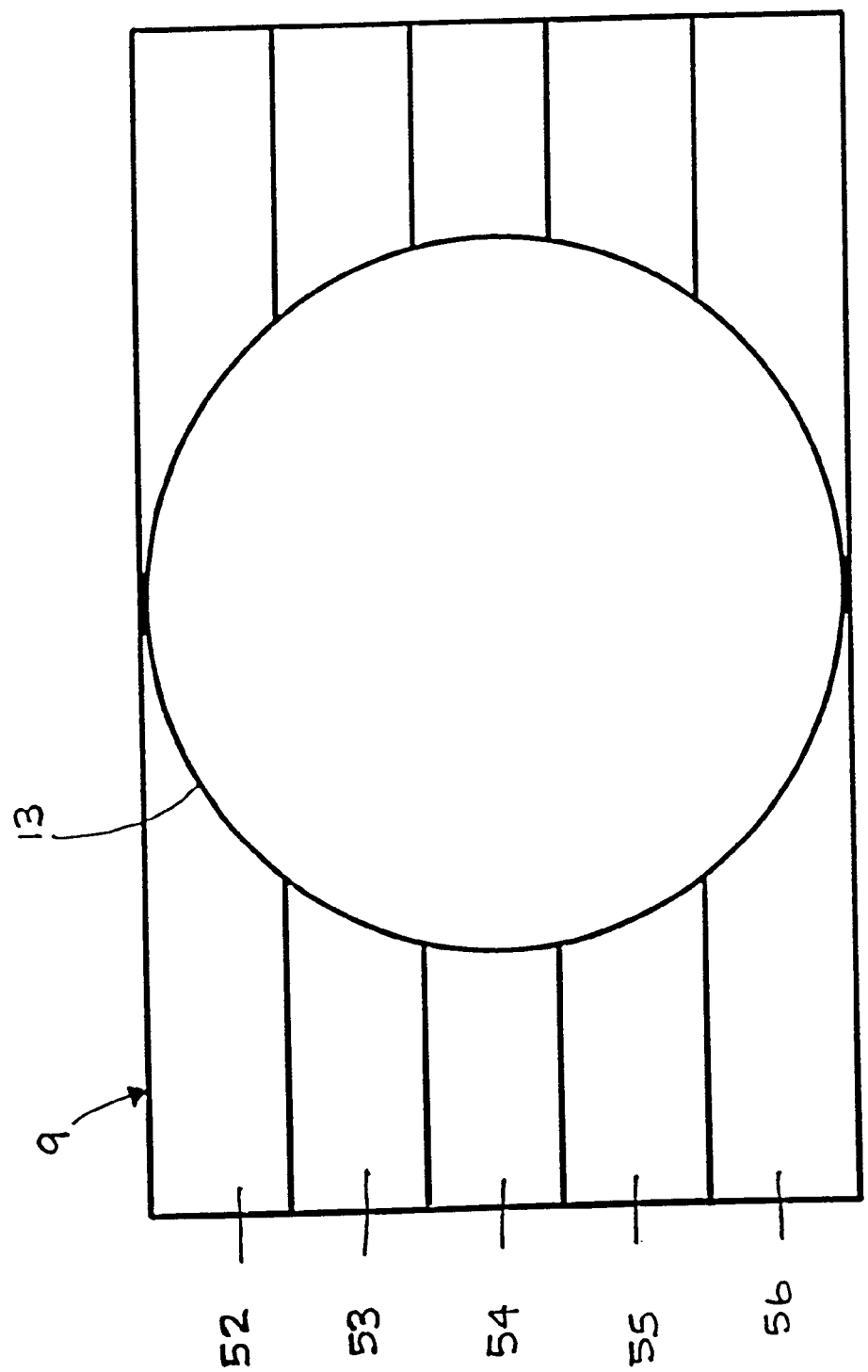
FIG. 2 shows how click distance can be represented as part of a screen window shown in FIG. 1.

Such a display is illustrated in FIG. 2, which shows only the display area 9 of the window 1, and in which for simplicity all detail in the first circular region 13 has been omitted. FIG. 2 differs from FIG. 1 in that the display area 9 is wider, and includes five areas 52, 53, 54, 55, 56 (divided by horizontal lines) between the outer border of the display area 9 and the circular first region 13 (each area in this case extends on both sides of the circle 13). This is a representation that the first file of the display can be reached from the user's present location along a route through hyperspace including five intermediate files (i.e. that the first file of the display is six clicks from the user's present location).

In deciding that the first file is six clicks from the present location, the method may have searched through all possible routes among the files to find the one which has the smallest number of clicks. For example, even if the user has selected the first file of the display by generating a display based on his current location, and clicking on, say, a seventh region, it is possible that the file represented by that seventh region can in fact be reached in only six clicks from the user's current location (i.e. by a different route through the hyperspace from the one of which the user was aware), and this is why the method has generated six areas (one for each of the intermediate files along the route and one for the starting file). The user may be able to obtain information on one of the five files along the shortest route discovered by the method, and/or indeed may be able to select and perform any of the operations which he can perform on the circular regions, by indicating (e.g. clicking on) a respective one of the areas 52, 53, 54, 55, 56. Of course, there will often be several different routes of equal shortest length between the user's current position and the first file of the display, so the method may select one according to some criterion so as to make a unique association between the areas between the first circle 13 and the display area 9, and respective files along a shortest path. Alternatively, the method may display more than one path, for instance in this case on either side of the circle 13.

Figure 3:
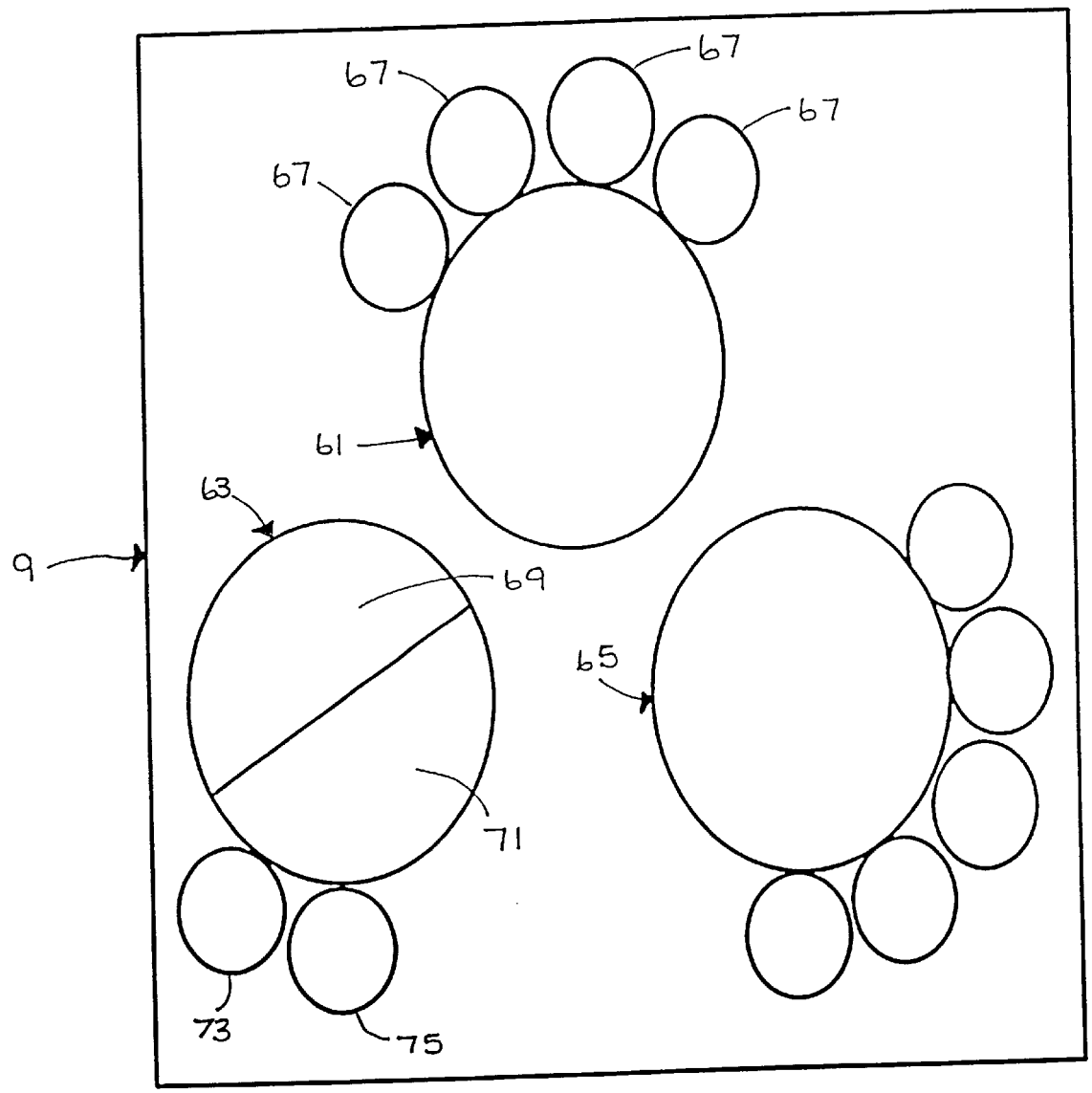
FIG. 3 shows a map generated by a second method according to the invention.

Turning now to FIG. 3, a second embodiment is shown of a map generated by a method according to the invention. In this case, the display region 9 is entirely occupied by a square first region representing the current first file. The first file is linked by anchors to three second files, which are represented by circular second regions 61, 63, 65. The second file represented by circular region 61 contains four anchors to third files represented by third circular regions 67, which are outside the second circular region 61 and touch its outer periphery. The second file represented by second region 63 contains a frame set which partitions the second file into two sections which are respectively indicated by sections 69, 71 of the second circular regions 63. The section of the second file represented by section 71 of the second circular region 63 contains two anchors, to files represented by third circular regions 73, 75.

Figure 4:
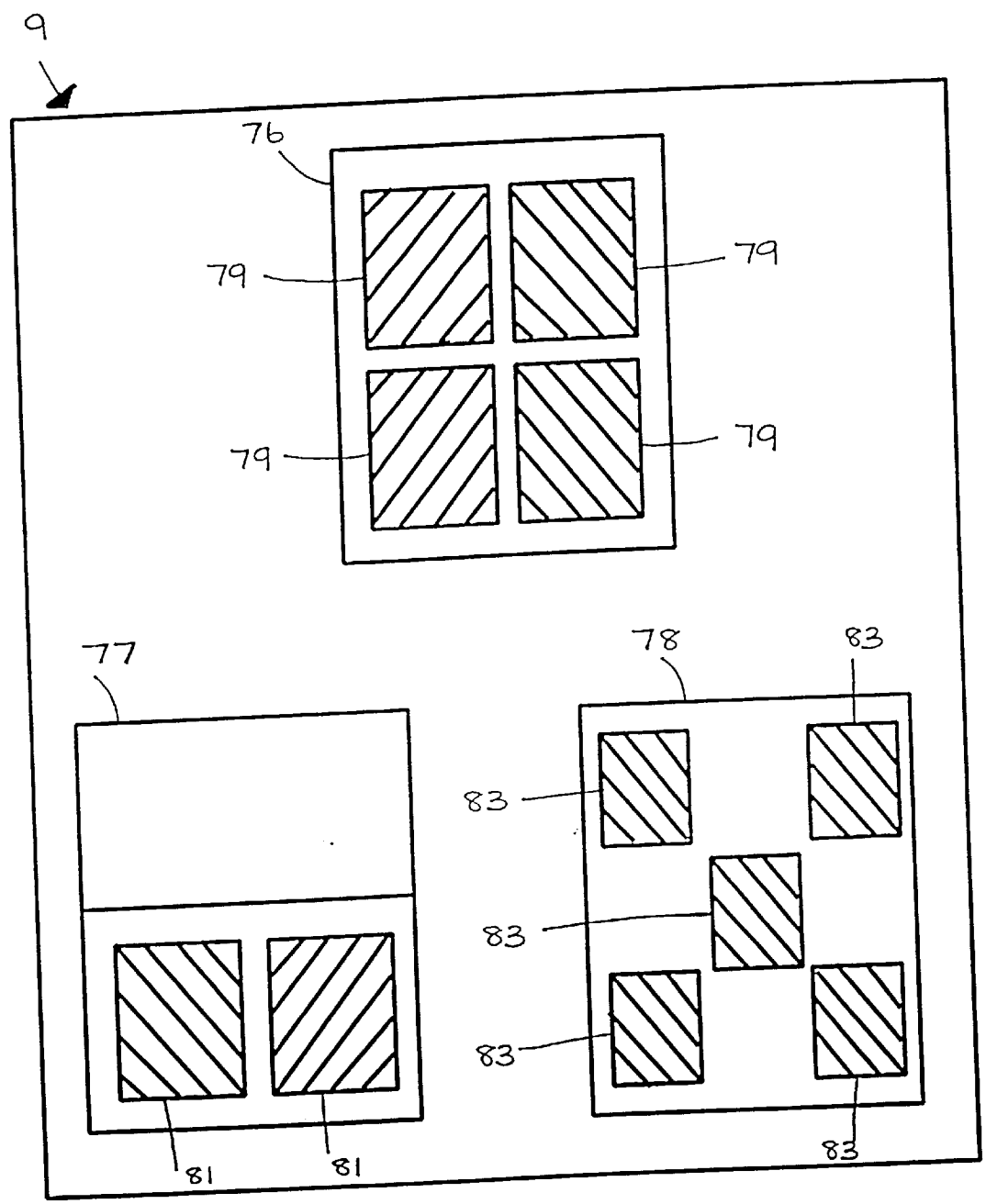
FIG. 4 shows a map generated by a third method according to the invention.

FIG. 4 shows a map generated by a third method according to the invention. This is distinguished from the first two methods in that the regions are square, rather than circular. The region of the world wide web mapped by FIG. 4 is the same as that mapped by FIG. 3 (i.e. FIG. 4 is logically equivalent to FIG. 3, apart from the colouring differences explained below). That is, the current first file (represented by a first region which occupies the entire display area 9) is connected to three second files (represented by square areas 76, 77, 78). The second file represented by a second area 76 contains four third areas 79 which are maximally sized to fill the second region 76 apart from a narrow margin around each third region. The second region 77 is shown divided into two, representing a frame set which divides a second file into two sections, one section containing two anchors (respectively pointing to two third files represented by third regions 81), and one section containing no anchors. The second region 78 represents a file having five anchors, to third files represented by third square areas 83.

Note that the arrangement of the four areas 79 resembles that of the spots on a die, as does the arrangement of the areas 83 within area 78. This is an example of a principle which may apply to all aspects of the invention, namely that the method may include for each number of (i+1)-th files which may be represented to a given i-th file, a respective path of discrete points whose orientation to each other and their parent is fixed which defines how that number of (i+1)-th regions should be arranged within the corresponding i-th region. That is, if it is found that there is a certain number (e.g. four) of (i+1)-th files, the method finds the corresponding path that number (four), and lays out the (i+1)-th regions according to this path. As shown in FIG. 4, the paths may, for example, correspond to the pattern of dots on a die, or they may be laid out to conform to a numeric keypad as described below.

The two types of hatchings in this figure represent the colours which may actually be present in the display produced according to the invention. The two colour possibilities may for example indicate which of two servers has supplied the respective file or some measure of the anticipated relevance to the user of a respective file. Another area of the window 1 (e.g. the left bar 7, which is not shown on FIG. 4) may include a key for the meaning of these symbols. For example, for each colour used for the regions, the bar 7 may include an area having that colour. The user can thus discover the meaning of the colour by indicating that area of the bar 7 (e.g. by positioning his cursor there), so as to trigger a display of the meaning of the colour.

Rather than colours, the regions may be differentiated by patterning (e.g. hatching, as shown in the Figure), flashing, shape, or by any other graphical means.

Figure 5:
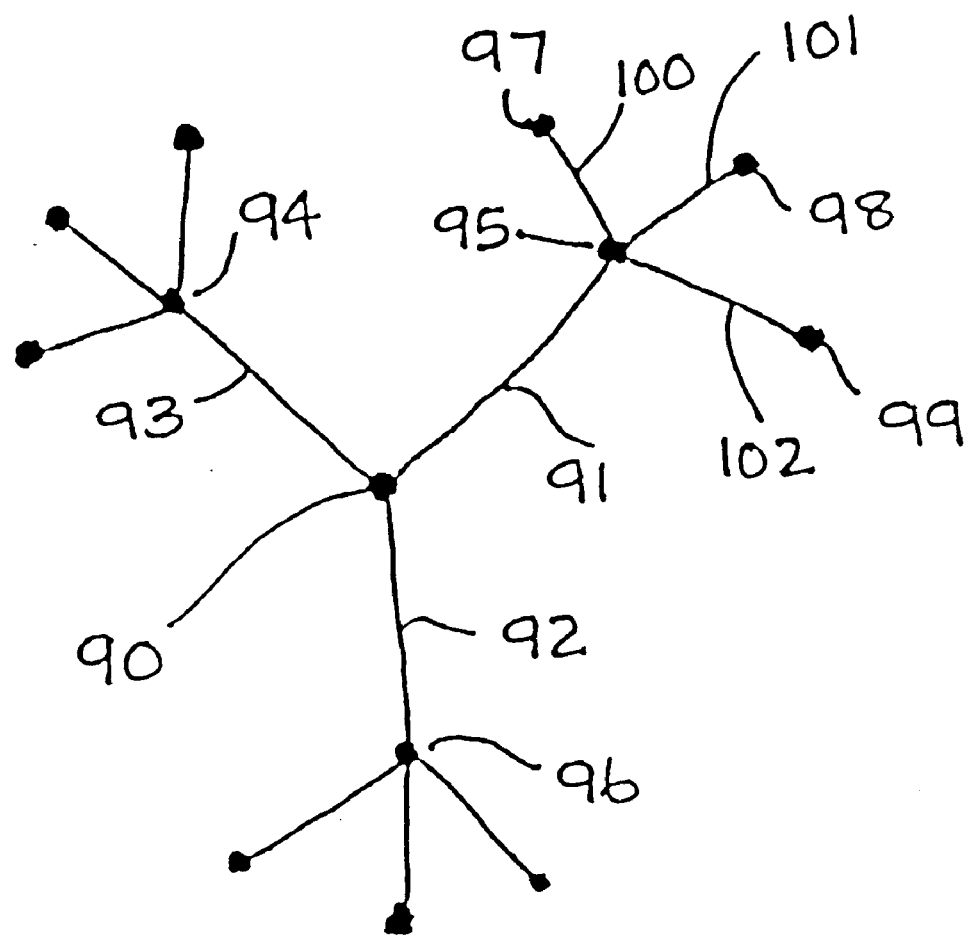
FIG. 5 shows a map generated by a fourth method according to the invention.

FIG. 5 shows a map generated by a fourth method according to the invention in which each file is represented by a region which is a dot (all dots being of equal size), so that the map is not within the scope of the first aspect of the invention, but is for example within the scope of the third aspect. The first file, represented by the central dot 90, is connected by hyperlinks represented by lines 91, 92, 93 to three second files, respectively represented by the dots 94, 95, 96. The second file represented by dot 95 is connected (by three hyperlinks represented by lines 100, 101, 102) to dots 97, 98, 99, which represent respective third files. The lines 100, 101 and 102 are each half as long as the lines 91, 92, 93. More generally, considering the extension of the diagram out beyond third files, the line representing the hyperlink from each i-th region to each (i+1)-th region is longer by a constant ratio (in this case 2) than each line representing a hyperlink between each (i+1)-th region and each (i+2)-th region. Of course, as the number of click increases, the dots of each i-th region will begin to overlap with the dots of the logically related (i+1)-th regions. This problem can be overcome, for example, by decreasing the diameter of the dots by a constant ratio or by limiting n as described in relation to aspect one above (e.g. the same constant ratio which relates line lengths) with increasing click distance from the first dot 90. For simplicity, the possibility of frame sets is not taken into account in this map (that is the map represents files equivalently whether they are pages or frame sets), although a skilled person will be able to generalise this display to include displaying frame sets also.

All the maps shown in FIGS. 1, and 3–5 are "bounded" in the sense discussed above. Furthermore, we can say that the maps shown in FIGS. 1, 3 and 4 are all "intensive", that is to say no matter how great the click distance between the present first file and the furthest file, the total area occupied by the regions remains constant (in fact, equal to the first region). By contrast, FIG. 5 shows a display which is not intensive, but is still bounded. That is, although the size of the display increases as the total click distance between the first and the furthest file increases, it remains less than a given finite size for any number of clicks. This can be understood by observing that the sum of the series, $$1 + \tfrac{1}{2} + \tfrac{1}{4} + \tfrac{1}{8} + \ldots = 2.$$

The display of FIG. 5 would not be bounded, for example, if the lengths of the branches did not decrease (or did not decrease sufficiently rapidly) in relation to the click distance from the first file.

Figure 6:
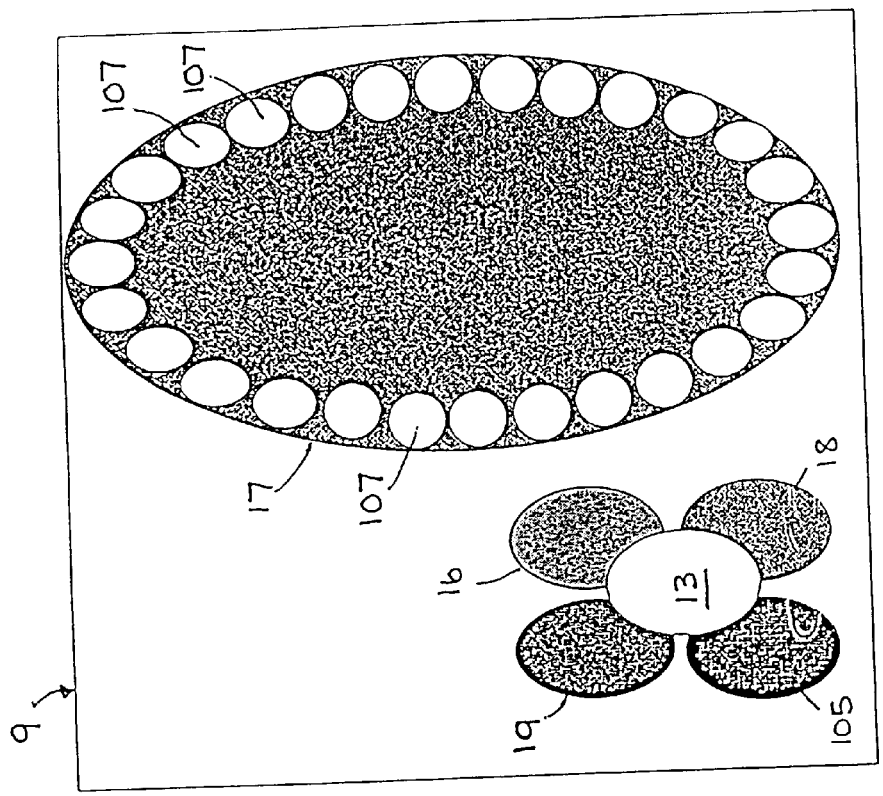
Figure 6:
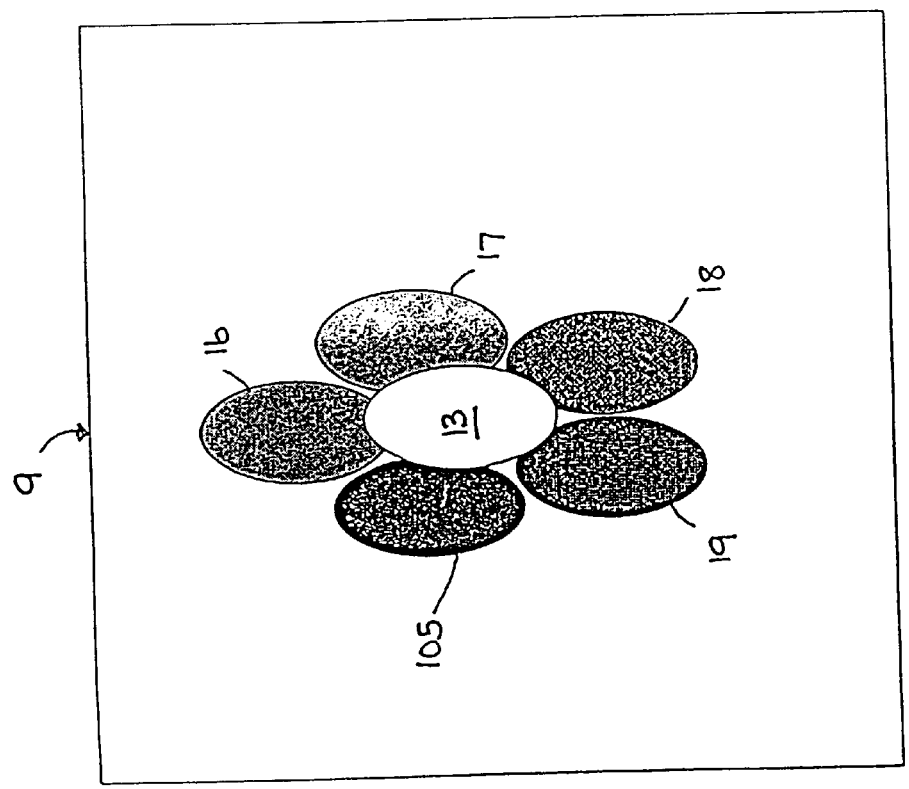
Figure 6:
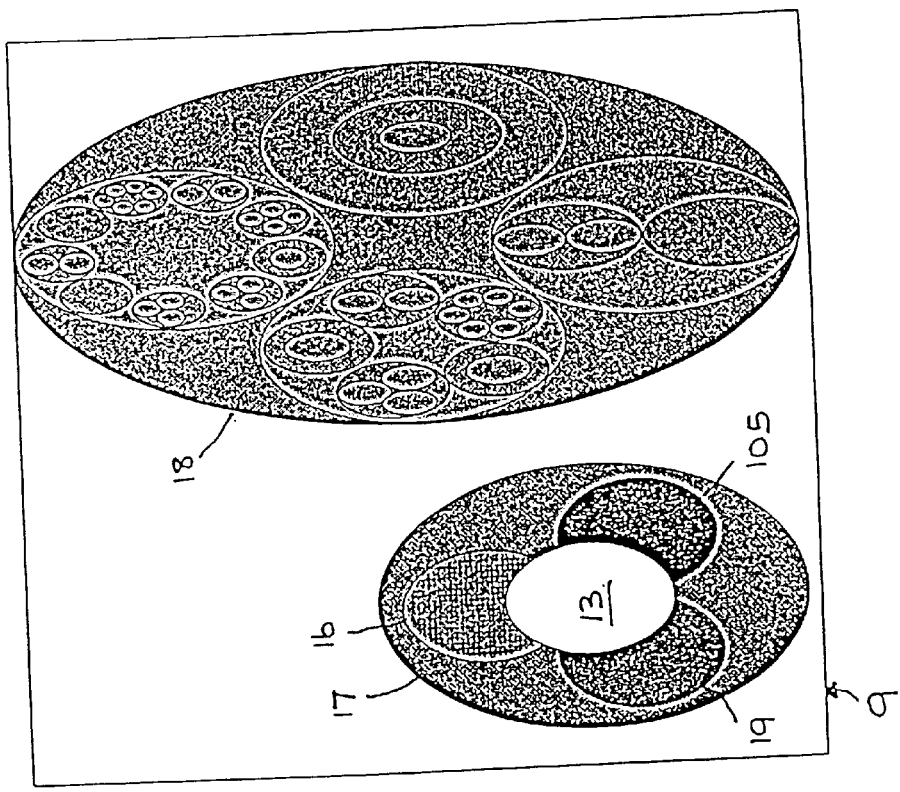
Figure 6:
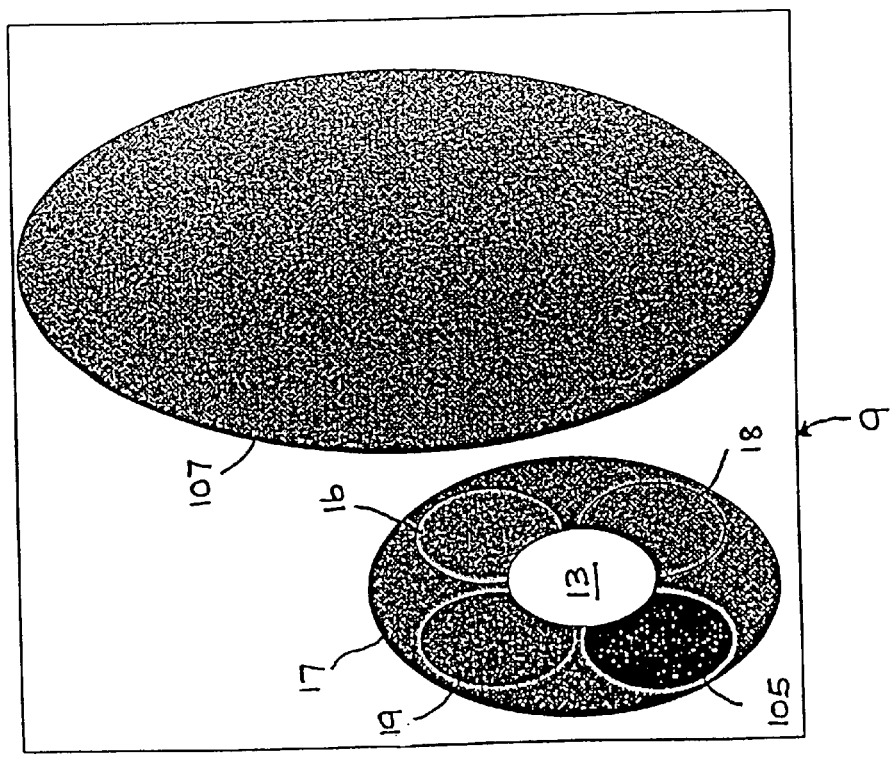

Turning to FIG. 6, FIG. 6(a) shows a map generated by a method according to the invention, in which within a display area 9, a first region 13 represents a first file (or for example a context sensitive search function), and four second regions 16, 17, 18, 19 respectively represent four files logically connected to the first file. A region 105 does not represent a file, but rather allows a user to return to some earlier state of the system by clicking on the region. For example, the region 105 may represent a previously defined system state, which can be recreated by clicking on the region. For example, the state may have been bookmarked by the user, or alternatively be a state pre-set by programming. Although only one region 105 is shown, alternatively a plurality can be provided possibly in the form of a map based on areas with decreasing distance scales, associated with respective previously defined states.

The user clicks on a region 17. The method then generates the map of FIG. 6(b), in which second region 17 is expanded, and 28 third areas 107 respectively represent 28 third files reachable from the file represented by region 17. Note that although the regions 107 are on substantially the same distance scale, some are ellipses while others are circles, but this is not a necessary feature. For instance, if the ellipses (or in similar but differing methods lenses or lozenges) had been formed so as to allow longer title labels to be displayed each within the borders of its respective region, then the ellipse 17 may contain only other elliptical regions 107. Inset in the lower left corner of the map is the map shown in FIG. 6(a) but adjusted to take into account the removal of the region 17 from around the first region 13.

The user then clicks one of the regions 107. The map is re-drawn as FIG. 6(c). The region 107 is re-drawn expanded. Region 17 is re-arranged as an outer border of the inset, thus indicating the history of the users voyage within the set of files, and can be clicked on to return to the map shown in FIG. 6(b).

The user then clicks on region 18. The map is re-drawn as FIG. 6(d). The files which are represented in region 18 (the third region chosen) are mapped, according to a predetermined logical relationship, in relation to those files represented in the region 17 chosen first, with the file chosen from that region as the starting point. For example, if the first region 17 chosen contained companies, from which one company was chosen, and the second region employees, and if the logical relationship was the one described above ("A first and second data file are logically related if any only if either the first represents an employee and the second a company they have worked for in the past, or the first represents a company and the second a current employee of that company."), then the regions within the largest region 18 would represent the company's employees, and the circles within those would represent the other companies they have worked for, and so on. The inset, bounded by the area 17, now shows only two second regions 16, 19 neighbouring the region 13, in addition to the region 105 which enables the user to return to an earlier state of the system.

The user can click on any of the smaller circles within the larger region to re-draw the map with that region as the largest region or starting point. The region 17 may alter to represent the main region to which the selected file belongs.

The user can also click on another of the regions 16 or 19 to map instead the relationships between the selected file and the collection of files that the newly selected region represents. In this case the region selected will be, as it were, expanded and the region it replaces will again become a region around region 13.

At any time the user can click on the white outer region to return to the very first representation.

As will be clear to a skilled person, many variations of the mapping methods explained above are possible. For example, although as shown above the size of regions decreases according to the distance (measured in clicks) between the files they represent and the first file, this is not necessary. For example, the maps may be limited to files only a small number of clicks away (e.g. 2 clicks), or parts of the map which fall outside the display area may not be displayed.

Additionally, as discussed above, it is not necessary that all the (i+1)-th regions within or around a given i-th region are the same size or shape. For example, referring to FIG. 6(b), this map may be varied so that one of the regions 107 is of greatest size, a neighbouring region 107 is slightly smaller, a region 107 next to that is smaller yet, and so on, so that each of the regions 107 has a different size. This possibility applies to all aspects of the invention throughout this document, but the variations in size and shape are preferably generated by a rule (e.g. the number of times a file has been visited or the type of file it is).

Figure 7:
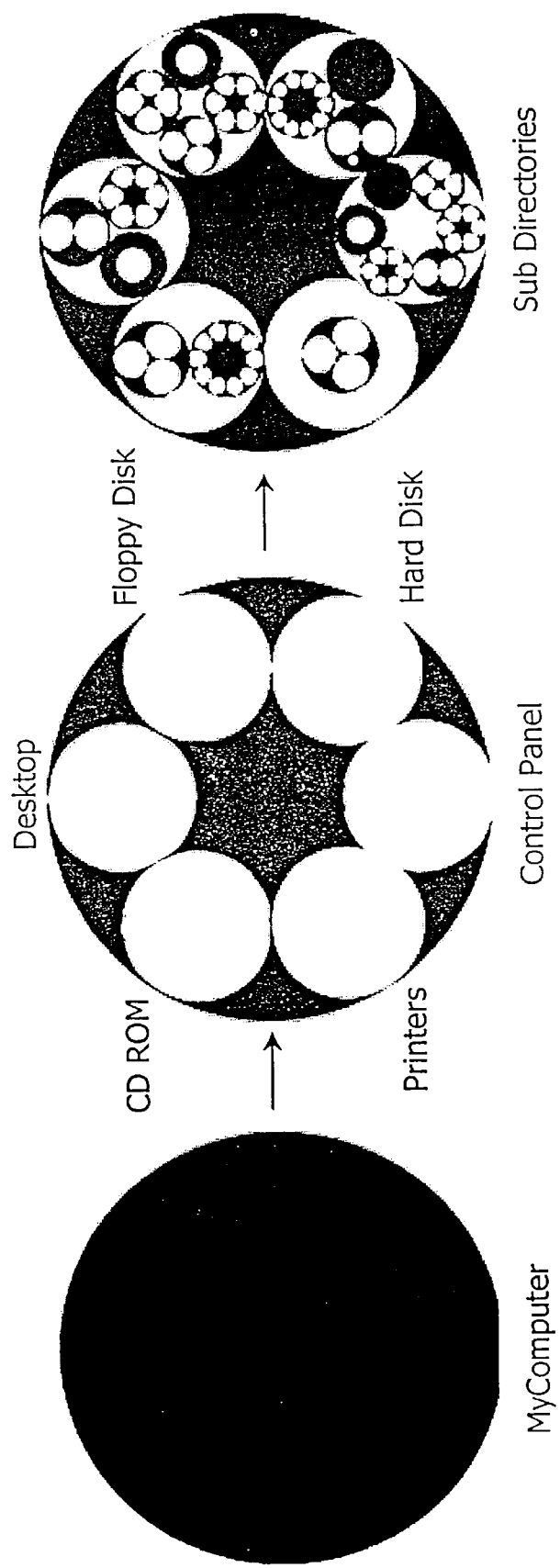

Turning to FIG. 7, a method according to the invention is illustrated displaying the files in a computer at approximately palm-top resolution. A user controls the method to proceed incrementally. First, as shown in FIG. 7(a) a single region representing the whole potential memory of a user's PC is shown. This, like a directory, can be thought of as a kind of data file. Then, as shown in FIG. 7(b) the functions of the computer (which are either data files or controlled on the basis of data files) are displayed. Finally, as shown in FIG. 7(c) the hierarchical structure of the next two levels of data files are illustrated, although they could be revealed more or less quickly (e.g. one or three levels at a time). The map illustrated in FIG. 7(c) is a map according to the invention, but it includes within it smaller maps which are themselves individually produced according to the invention and revealed either individually (e.g. upon a user pointing their mouse at a particular area) or in groups (e.g. layer by layer as described above).

Table 1 compares opening a file from a directory structure using a system browser according to the Windows expanding tree method discussed above, using an "Inxight" hyperbolic representation of the files of a directory (as mentioned above, the paper of John Lamping and Ramana Rao discussed above which introduced the concept of a hyperbolic map, did not specifically mention opening a file, but here we will consider a variation on that technique in which clicking in a certain way on a dot of the hyperbolic map which represents a file, moves to (e.g. opens) that file), and using a map ("fractal space map") like the one shown in FIG. 1, that is according to the present invention.

TABLE 1

|  | WINDOWS EXPANDING TREE | INXIGHT HYPERBOLIC TREE | FRACTAL SPACE MAP |
|---|---|---|---|
| Clicks to open deepest directory | 6 | 4 | 2 |
| Clicks from deepest directory to top level | 3 | 3 | 1 |
| Directory levels accessed in one click | 1 | 2 | 4/5* |
| Percentage of directories opened with one click | 7 | 17 | 63/80* |
| Max number of directories opened with one click | 17 | 90 | 1200/9600* |
| Characteristics | no sense of whole need accurate clicks | some sense of whole details very unclear | excellent overview easy selection |

*Using a sliding click

The values in table 1 are calculated using a specific directory structure which has 200 members arranged in 6 levels (the directory structure is not selected to favour the present technique). The term "sliding click" used in table 1 means that a user moves an indicating device (e.g. a mouse) in a given direction until it reaches a region at which it stimulates the display to change (e.g. by opening a display panel, as described below), and then clicks and holds down for instances a mouse button, thus fixing the display panel, and allowing the user for instance in the case where the display panel displays the names of the particular region's children to select a child file by moving the mouse pointer to the relevant name label or towards it until it becomes highlighted, and the releasing the mouse button. That is, a "sliding click" is a generalised form of click motion. There is known a manifestation of the hyperbolic tree in which the user can make similar dragging motions with their mouse, but this causes the entire map to be continuously redrawn from a changing point of view until the mouse button is released. By contrast, the sliding clicks described above relate to a clicking motion which brings up information adjacent to or superimposed on part of an unchanging map, and a second clicking motion is subsequently performed to for instance open the file corresponding to a region.

The files to which the present invention in all its aspects is applicable may be classified in several ways. A first classification is "local vs. network", where local files are files within a single device (or a set of spatially close devices), and network files are stored in more distant locations, e.g. networked by telecommunications. Another possible classification is "content vs. functional", where "content" files are files of which the content itself is displayed to a user, and "functional files" are files which contain programs for performing a function. Thus, a help file in a user's PC is a local content file (a user reads the text in the help file to understand a function of the PC); a web-site showing prices of an article is a network content file (a user accesses the server of the file to read the content); driver software in a PC for controlling a printer is a local functional file; an application stored on a web site is a network functional file. Another example of a network content file may be a file concerning say current open connections generated by a piece of hardware which operates in a network, e.g. a switching circuit.

In many of the aspects of the method described above, since the distance scale gradually decreases (e.g. with increasing distance from a first page), the regions representing i-th files become smaller with increasing i, and correspondingly more difficult to see. As described above, a user may be able to re-draw the map starting with the new data file as the first data file to increase the distance scale. However, there are other methods of allowing the user to gain a greater insight into the meaning of small regions.

A first possibility is to give the user the option of magnifying a part of the map (that is, the main underlying map is not re-drawn but a new map is drawn produced either by simply magnifying a part of the map selected by the user or by creating a new map by applying the method for a certain number of levels to a file selected by the user (e.g. by means of a mouse), over the main map, for instance centred on the mouse pointer, the center of the selected region or some other point. For example, a user may be able to define an area ("lens") on the map which is then displayed as if it were seen through a lens on an increased distance scale. Note that lens and other magnifications are combinable with a sliding click, and/or a mechanism to allow successive magnifications without re-drawing the underlying map.

A further possibility (combinable with the first) is for the (i+1)-th regions of a given i-th region to be respectively represented by areas in a different portion of the display, with relative positions corresponding to the relative positions of the (i+1)-th regions, as in FIG. 10(g) for instance. This is referred to here as a "distinct magnification".

Optionally, indicating one of these regions (e.g. with a mouse or by depressing a key) has the same function as indicating the corresponding region on the map. In this case, the portion of the map is referred to as a "control pad".

Figure 8:
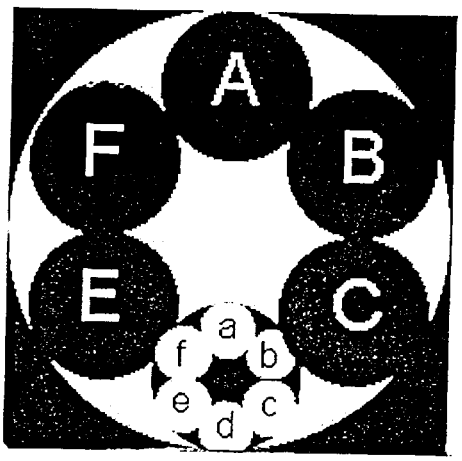
Figure 8:
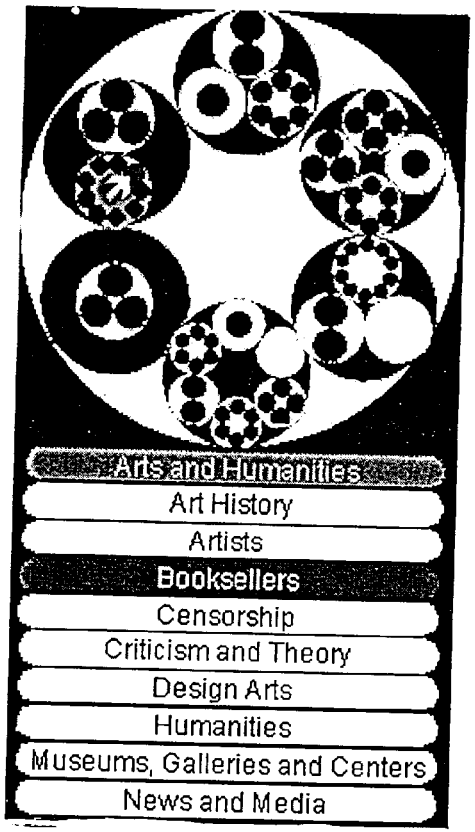
Figure 8:
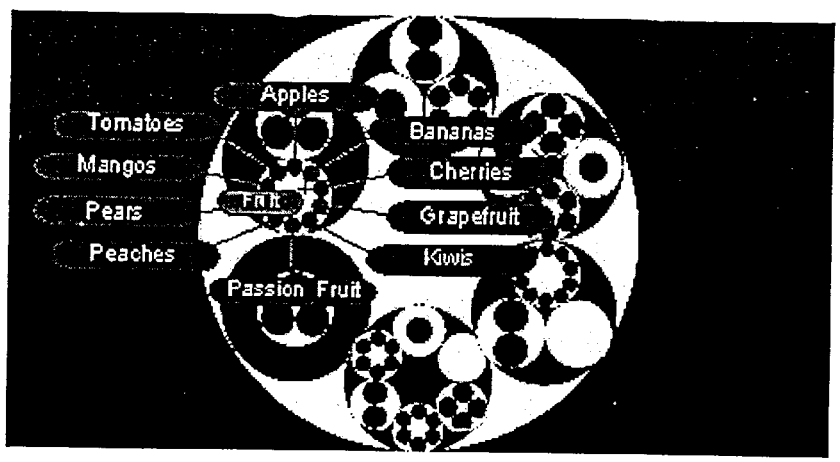

FIG. 8 illustrates a variety of alternative (or additional) techniques for indicating to a user the significance (e.g. the title) of data files in a map according to the invention. In FIG. 8(a), the significance of the data files is indicated by "icons" (represented in the figure by the upper and lower case letters, although of course other symbols may be used). The icons for the (i+1)-th files displayed inside an i-th file might only become visible (and possibly also the icon representing that i-th file might disappear entirely as shown) when the user highlights that i-th file in some way, for instance by means of a mouse. This is referred to here as an "icon trail", and can help the user concentrate on the relevant portion of the map.

In FIG. 8(b), the meaning of the data files is indicated by a separate display panel. For the file a user is interested in (a 4-th file, indicated by an arrow), the display contains a heading of the title ("arts and humanities") of the 3-rd file to which the 4-th file is logically related, and all the nine 4-th files related to this 3-rd file. Of these, the title of the 4-th file in which the user is interested ("booksellers") is highlighted. The highlight may alternatively or additionally be indicated by drawing a line from the region of the map that is currently highlighted to the corresponding part of the display panel (e.g. if the display panel is drawn to either side of the map instead of below as shown), and/or the map and display panel may be colour coded in order to relate in addition for instance all the 4-th regions to their titles.

FIG. 8(c) shows an alternative technique in which information (e.g. the titles as shown) concerning the relevant data files is generated within separate (possibly transparent) areas that are connected by lines to their corresponding regions and that are drawn over the main map. The arrangement of the areas may be determined to ensure that the areas do not overflow outside the display.

Any of these techniques may allow a user to derive information about the meaning of a file without actually opening it, thus enormously speeding up for example movement to an appropriate file. In addition the second two techniques can be used in conjunction with the sliding click technique described above.

As mentioned above, in all maps according to the invention when a region can be reached from (i.e. is logically related to by an arbitrary number of steps) the first file along two or more different paths, it may be represented only by a single regions (i.e. showing one possible path), and regions which indicate other paths may be omitted. Alternatively, more than one such region may be drawn for that file. In the latter case, (i) the descendants of that file may be drawn in only one of the regions, or in more than one, and/or (ii) when a user indicates one such region (e.g. by moving a mouse over it), regions representing the same file may be highlighted, inserted into the map, have its descendants drawn within them, and/or have some or all of its parent regions indicated (even if a copy of the particular region in question is not drawn). In this way the networked, rather than hierarchical, nature of the logical connections can be clarified to the user.

It is possible for the map to display (e.g. by a separate display panel) information concerning data files which have a value of i greater than n (that is data files which are not represented on the map of the invention). For example, the user might have the option of displaying information concerning data files for which i=n+1, by for instance positioning his mouse over a file for which i=n. This i-th layer is referred to as an "invisible layer".

FIGS. 9 to 12 relates to a mobile telephone device including a display 200.

In much of the operation of the telephone device the display displays conventional information, but the mobile telephone has at least one mode of use (illustrated in FIG. 12) in which the display 200 includes a map 202 produced according to the present invention.

The display further includes a 3×3 grid 204 of icons, which may be icons representing the significance of regions in the map 202 (e.g. the icons might represent the meanings of (i+1)-th files logically related to a certain i-th data file), or may be a distinct grid allowing commands concerning the regions of the map 202 (e.g. the insertion of a bookmark) to be entered via the key pad in a way consistent with that described below (hereafter called a "command grid").

The detailed structure of the fractal space map 202 includes a number of distance scales, and on each distance scale the map is a 3×3 grid. This is particularly suitable because the pattern of buttons representing the numerals 1 to 9 on the telephone handset is also a 3×3 grid. That is, in modes in which the user is selecting an item based on the fractal space map 202, he can do so at each distance scale by depressing a key of the part of the key pad representing the numerals 1 to 9.

The display also shows two "shortcuts" ("system" and "cancel"), that is functions which can be accessed by depressing other keys. In this case the two functions "system" and "cancel" can respectively be accessed by depressing two upper keys on the keypad, and might for instance respectively cause a second command grid to be displayed instead of the first and cause the first command grid to be replaced with say a distinct magnification of the currently highlighted region in the map 202.

FIG. 9 shows a map produced according to the invention, suitable for use as the fractal space map 202 of FIG. 12. As will be seen, it has several distance scales, the largest of which is essentially the width of FIG. 9. Another distance scale ("the first distance scale") is slightly less than one third of this, and is the distance scale on which eight 2-nd regions 204, 206, 208, 210, 212, 214, 216 and 218 are drawn (that is this distance scale is the horizontal width of the regions). The area enclosed by the eight 2-nd regions is left for displaying an icon representing a meaning.

A yet smaller "second distance scale" is a distance scale on which 3-rd regions 220, 222, 224 (for example) are drawn, and is approximately one third of the first distance scale. A "third distance scale", which is approximately one third of the second distance scale, is a distance scale on which 4-th regions 226 etc, are drawn.

First, referring to FIG. 9, a user can see at a glance that there are at least eight 2-nd data files, represented by the areas 204, 206, 208, 210, 212, 214, 216, 218, and that there are at least eight 3-rd data files 220, 222, 224 logically related to the 2-nd data file represented by region 204. There is one data file (represented by region 226) which is logically related to the 3-rd data file represented by 3-rd region 220.

Also, for instance, there are only 4 3-rd data files logically related to the 2-nd data file represented by region 210.

As explained above, the map according to the invention shown in FIG. 9 can display a maximum of 8 (i+1)-th directories related to each i-th directory (the central region of each square may be reserved for an icon). The question therefore arises of what, if anything, the method of the invention should do in the case that there are more (i+1)-th files than a predetermined upper limit, M. There are two possibilities. Firstly, in or near the i-th region, a symbol may be drawn (for example in the central part of the square 204 of FIG. 9) indicating that there are (i+1)-th files which have not been represented. Such a symbol could, for example, be displayed in the central part of square 204. Alternatively, the region representing a given i-th data file could be expanded (e.g. to encompass the two squares 204 and 206) to give sufficient space for the display of all of the (i+1)-th files. For example, in the case that the i-th region is a combination of squares 204 and 206, the display could represent up to 16 data files logically related to the i-th data file.

The value of M may be chosen according to physiological or psychological data. For example, it is generally accepted that in many situations humans dislike having to choose between a large number of alternatives, so the value of M is preferably not more than 5, 6, 10 or 20 in all aspects.

FIG. 10 shows two of the operations of the telephone. FIG. 10(*f*) to FIG. 10(*j*) show how the mobile telephone can be used to make a telephone call. The starting configuration is shown in FIG. 10(*a*) and FIG. 10(*f*). The display area is indicated generally by 232. The keypad panel is represented by portion 230. The upper portion of the display area is a ring 233 of 8 squares, indicating functions accessible to the computer. Although not shown clearly in this figure, each square has a symbol indicating a function. For example, the symbol in the position corresponding to the 2 key has an icon representing "telephone directory". The display area includes two shortcuts, "search" and "speed" in positions on the display area corresponding to the two upper keys on the key pad.

The mobile telephone is equipped with a directory of files, which may be stored within the mobile telephone or alternatively at a remote location. The files include at least one file storing names and corresponding telephone numbers.

In this example, the names are divided into eight separate files (respectively storing names beginning with the letters A–C, D–E, F–H, and so on) which are all in a single common directory.

The way in which these ranges of names are chosen may optionally depend upon the number of names in the categories. For example, in the case that there are a disproportionate number of names beginning with the letters A, B and C, the names may be rearranged so that the first file contains only names beginning with the letters A and B while names beginning with the letter C are stored in a separate file.

To make a telephone call to a person whose number is stored in the mobile telephone, the user has two choices.

Firstly, he can press on key 2 (since key 2 is in the position corresponding to the telephone symbol in the array 233. The telephone then generates the map 234, as shown in FIG. 10(*g*). The map 234 is according to the invention and shows the directory structure of data files available to the user. The display further includes a ring 235 of eight icons respectively representing functions. The user may then press on the key 7, to indicate that he wishes to access the function "search for names" (a function represented by an icon in the 7 position of the array 235).

This generates the display shown in FIG. 10(*h*). The array of squares 238 indicates the meanings of the level of data files in the directory showing ranges of letters shown in the map 234.

The user can move directly from the mode shown in FIG. 10(*f*) to that shown in FIG. 10(*h*) by depressing the left one of the two upper keys, to take the shortcut "search" (i.e. search for names).

Suppose that the user wishes to telephone a person called "Raiskinen". In this case, the user presses key 7 (corresponding in position to the range P–R) to move to the state shown in FIG. 10(*i*), that is a list of names in this range. In this case, all names in the range can be fitted into one screen when the user requests a scrollable list of all matching names to be generated (if the number of names in the address book beginning with a single letter were great, the file structure might alternatively be arranged using also subsequent letters of the name, and in this case the user may have to specify the range of subsequent letters in the person's name). By pressing on the appropriate key 8 the user can then automatically call Raiskinen.

FIGS. 10(*a*)–(*e*) show how a user can divert a call. Starting in the starting configuration shown in FIG. 10(*a*), double pressing or holding down 5 for a short time (e.g. half a second), lists the functions on the telephone. The user selects 3 to bring up the call register (telephone functions) reaching the configuration shown in FIG. 10(*c*), then noting that the icon for divert is shown in the 3 position presses 3, to reach configuration 10(*d*). The user can either directly input the number (of a person called for instance Ilka Raiskinen) to whom calls should be diverted, thereby reaching configuration 10(*e*), or press the key corresponding to the search shortcut to divert to FIG. 10(*h*) and have to opportunity to search for a person to whom the calls should be diverted among the people in the address book in the manner described above. This shows how the invention can be implemented so as to facilitate the execution of complex functions within a micro environment.

FIG. 11 illustrates how a mobile telephone according to the invention may be used to access the worldwide web. Five stages are shown illustrated respectively in FIGS. 11*a*, 11*b*, 11*c*, 11*d*, and 11*e*.

Initially, FIG. 11(*a*), the telephone is not connected to the web, and is in a mode corresponding essentially to FIG. 10(*a*). The display 332 indicates general information. The square in the 4 position of the ring 233 (i.e. the middle of the left side) has an icon representing "web functions". The user double presses 4 to move to the mode shown in FIG. 11(*b*).

At this point, the telephone is still not connected to the web, but the display area has now generated a map 234 according to the invention showing the files of the telephone (and equivalent to the map shown in FIG. 10(*c*)). The display area also includes a second area 236, which comprises 8 square areas drawn in a pattern corresponding to the pattern of the areas in the map 234. Furthermore, the display includes the two shortcuts "search" and "connect" in positions corresponding to the buttons to the two upper keys.

A click on the right upper key button, or possibly one of the icons in the grid below by means of the keypad, activates the "connect" function, and the mobile telephone is connected to the web.

Initially, the mobile telephone connects to the "portal" home page, shown in FIG. 11(*c*), on which the map 234 is based. This home page itself, or word(s) (e.g. "Portal") representing it, can be shown in box 238. Pressing the key "1" on the keypad moves to (but in tjos case does not yet open, i.e. extract data from) the file represented by the upper left second region 240. This gives the display shown in FIG. 11(*d*), in which the region 240 is in a highlighting colour (e.g. red) or flashing, and the lower portion of the display 232 indicates the title of the opened file.

Pressing the right lowermost key (usually #) opens (extracts data from) the file represented by the region 240, specifically the weather forecast for that day. This is shown on FIG. 11(e). The upper region of the screen is now effectively laid out on a 3×4 grid with the "Name", "Link" and "Information" data accessed with the bottom row of keys on the telephone keypad. The invention can in general be combined with any arrangement (whether grid-like or otherwise) of any number of keys, and the keys that are active at any one time may change according to the user's actions.

As discussed above, the number of pixels on a display screen is limited. FIG. 13 shows how a display showing all the information present in FIG. 10 can be produced on such a screen. A region 2041 (corresponding in meaning to the region 204 in FIG. 10) can be drawn as shown in FIG. 11(b) on just a 11×11 grid (note this arrangement leaves one pixel between the blocks corresponding to regions 220 and 222 on FIG. 9, and between the blocks corresponding to regions 222 and 224). To present a map which is equivalent to the whole of FIG. 9, three of the 11×11 grids shown in FIG. 11(b) are arranged with a one pixel space between them, as in FIG. 13(a), giving a total width of 35 pixels. In other words, a diagram containing all the information of FIG. 9 can be presented in a mere 35×35 array of pixels.

In practice, the present inventor has found that an array of this size tends to be hard to read unless the pixels have more than two states (e.g. not just black and white, but one or more further colours). It has been found to be acceptable in the case that each pixel has three states.

To improve clarity (and especially in the case that the pixels are limited to two states, e.g. black and white), an additional pixel may be left between blocks corresponding to regions 204 and 206, and between blocks corresponding to regions 206 and 208 (and the vertical spacing of the second regions is increased correspondingly); the grid then becomes 37×37. Preferably, the number of pixels along each side of the map is less than 150, more preferably less than 100. An especially preferred case is that the number of pixels used to form the display is 77×77 (as in FIG. 9).

Additional rows of pixels can be left either between blocks of the display or around their other edges for gradually increasing clarity according to the capacity of the display device (taking into account other information which the display device is required to display at the same time as the map of the invention). The map shown in FIG. 13 is used in the telephone shown in FIG. 12. Note that at any level of depth q (up to eight) data files are laid out in the first q positions in a sequence of M=8 positions, corresponding to the positions of the numeral keys 1–4 and 6–9. In this case the sequence is in a clockwise closed path of eight positions. The path is in relation to a predefined direction in the map (for example the first 3 positions are in the horizontal direction on the screen).

We now describe in detail various techniques for drawing a map within the scope of the invention.

Whereas in FIG. 1 the regions 25 are sized so as to exactly fit neighbour-to-neighbour around the inner circumference of the region 16, in FIG. 14 an i-th data file is represented by a region 316, and (i+1)-th data files are represented by overlapping circular regions 325. To reduce the chance of confusion, the user may be able to indicate one of them (e.g. with a mouse), highlighting it and putting the other regions 325 with which it overlaps into a background (e.g. invisible) mode.

An alternative to overlapping regions 325, is for regions 325 to be squeezed (e.g. from circles into ellipses or as shown in FIG. 15) in a similar way to that described above in relation to FIG. 13. The degree of squeezing may be chosen so that a desired number of circles may be drawn inside the inner circumference of the region 316 without their radial extension becoming overly small. FIG. 15 illustrates also the use of an incrementally varying grey scale to distinguish the regions in the display. The shading may be between two colours, and the regions to be coloured may be split into two or more segments each of which uses the full range (or its own particular range) of colours. For instance children to the right of the parent may be shaded from white to black as the user moves clockwise, and those children to the left may be shaded from black to white. This allows the regions to be shaded in a continuous or incremental manner, thus avoiding a major discontinuous change of colour, and thus an undue emphasis being given to files adjacent the discontinuity which is not merited by any significance of those files.

Although in FIGS. 1, 14 and 15 all regions may be equally coloured, in fact any colouring scheme is possible. For example, the second regions arranged inside the first regions may be coloured according a gradual colouring scheme (e.g. on a grey level with grey level successively rising around the circumference of the i-th region; or a successively rising multicolour level).

FIG. 16 shows an example of an "implicit intensive" method for drawing regions, in which (i+1)-th regions 232 are drawn only partially overlapping with the i-th region 330. Incidentally, the method is called "implicit" because all the (i+1)-th regions 332 are within a circular region 334 (which is or could be used in the construction of or interaction with the map and so "implied" but nevertheless possibly remain invisible to the user).

FIG. 17 shows another map produced according to the invention. The region 340 represents a first file, while the four second regions 350, 351, 352, 353 represent second files. Each of the four regions 350, 351, 352, 353 is drawn according to the same distance scale, in the sense that they each are drawn to be maximally sized within the constraint of a respective shape limitation within a notional circle 347 as in FIG. 16 which is identical for each of the four second regions. Note that the second region 353 is circular, and thus can entirely fill its notional circular bound. This illustrates that although in FIG. 17 the four regions are drawn their sizes dependent upon the same distant scale, this does not automatically imply that they have an equal maximum diameter for example or shape.

FIG. 18 shows a further map according to the invention, drawn with a triangular symmetry. In this case, the value of M is equal to 3, since a method does not display more than 3 children of a given parent, and fixed because the first two regions to be drawn inside any one parent region are drawn in the same position relative to their parent whether the parent contains two or three children (the case where a region contains only one child being treated differently as is often the case).

FIG. 19 is another map according to the invention, in which the (i+1)-th regions of each i-th region have a width (as viewed in the orientation of the figure, which need not be the same as the actual display) equal to half the width of the i-th region, and a height which is equal to the height of the i-th region divided by the number of (i+1)-th regions. One of the three second files is a frame set, as indicated by the dashed line. The set of data files represented by FIG. 19 is, in fact, identical to that shown in FIGS. 3 and 4. This map is directionally invariant and exhibits the fourth numbered preferred feature given above under the fourth aspect of the invention. In this respect it is unlike a tree map;

FIG. 20 shows another map drawn according to the invention, showing a set of files equivalent to those drawn in FIG. 19. This time, the rule is that all files are ellipses, having their long axis on a horizontal (as viewed in the figure) line through the middle of the screen. A frame set is representing with a vertical line dividing the ellipse in two. All third regions have an equal length in their long axis, and within all of the above constraints, each ellipse is maximally long. This gives a result that the size of each of the second regions depends on the number of third regions which they respectively contain.

As explained above, the invention is not limited to mapping a plurality of data files, but may alternatively map segments of a single data file, or segments of a plurality of data files. One possibility is for these segments of data file(s) to represent the respective portions of a computer program. For example, each segment could be a portion of a data file containing a particular sub-routine. The logical relationship between portions of the program (for example the occasions at which sub-routines can be called) represent another set of logical relationships which can be mapped by a method according to present invention. Any programming or content presentation language grammar or code instances can be represented in this way, for example the inventor has found it to be particularly appropriate for a HTML structure.

A given program may be distributed through one or more data files in a way which is not related to the conceptual structure of the program (e.g. some subroutines may be a complete data file; other subroutines may be only a segment of a data file; other subroutines may be distributed over several data files). Despite this, the user may be able to select the logical relation between the segments of the data files (or complete data files) to be the conceptual structure of the program, so that the regions of the map correspond to subroutines and the map is drawn based on a single sub-routine (playing the role of the first data file).

Use of a map of this kind can facilitate the design of a (web) page, including its layout, e.g. in HTML. In the case of producing a display including a map produced according to the invention, a further part of the display area may represent the page(s) which the language generates on a user's screen. The user may have the option of indicating a portion of the map (e.g. by a mouse movement, or pressing one or more keys), and in this case the portion of the page(s) representation associated with the portion of the program corresponding to the region of the map generated by the user, may be highlighted.

As discussed above, the map of the invention need not be the whole of the display generated on the user's screen. Furthermore, in mapping a set of data files a map according to the invention may be used to map files up to a value of i=n and some other mapping scheme may be used to map files for higher values of i.

More generally, within the scope of the invention, the methods may map (i+1)-th files having a logical relation to an i-th file in the ways described above for i in the range j, . . . , n where j is an integer greater than 1, and according to a different scheme (e.g. not having a decreasing distance scale) for i outside this range. In principle, the map could even be generated, within the scope of the invention, with regions having a decreasing scale (e.g. decreasing size) for values of i within a plurality of ranges, and according to a different drawing scheme (e.g. the hyperbolic map scheme) for i outside these ranges. This sort of map is here termed "partial".

In all aspects of the invention, the user may have the option of inputting information to select a particular region within the map. For this he may use the keyboard of a computer (if the map is generated in the device which is, or is connected to, a computer), a slider, a 2D roller, a knob, a pad, a touch-sensitive screen, a grid or other arrangement of keys (e.g. a mobile telephone), or any other device.

A particularly readily comprehensible manner of navigating through the map is for the user to do so level by level (that is for successively increasing values of i). Since the (i+1)-th regions of each i-th region are preferably laid out along a one-dimensional path, the user may at each level select a file using a one-dimensional movement. Having thus selected an (i+1)-th region, the user may then indicate (e.g. by depressing a key) that he wishes to navigate within the (i+2)-th regions related to that (i+1)-th region. Thus, selection of any file in the plurality of data files may be accomplished purely by a one-dimensional indication, coupled with an indication of changing level to successively increasing i.

This can make navigation very much easier since it is physiologically natural for a human operator to make a one-dimensional motion, as compared to a two-dimensional motion. The one-dimensional motion in some situations may be for example be moving a mouse in the user's hand in a one-dimensional sweep (e.g. a hand movement with the user's elbow static), or a motion of an indicating device which is intrinsically one-dimensional, such as a knob or slider.

To facilitate further this motion, a section of the display area may indicate by symbols in a substantially straight one-dimensional line, the set of files between which the user is choosing by the one-dimensional motion. For example, a row of shapes (squares) may be provided (possibly scaled so as always to fit the same onscreen area however many files need to be thus displayed) corresponding in number to the number of (i+1)-th files from which the user makes his selection. The inventor has found that it is easiest if this on-screen area is horizontal on the display area as viewed by a user in some contexts for the physiological reasons given above: in this case the user is far less likely to be disorientated by any curvature in the path in the mapping of the invention along which the (i+1)-th regions are laid out.

We can draw a distinction, in fact, between three methods of accessing files. A first method, "serial access", may moving through a list of files one-by-one with an action (for instance a press of a button or moving a roller indicator on by one notch) for each motion. A second method "parallel access", is a series of one-dimensional motions (as in the last paragraph). A third method, "fractal access", is by a two (or more) dimensional selection, e.g. by a mouse on the map shown in FIG. 1, to leap to a file several logical links away. Usually parallel access is the fastest access which can be achieved without a two-dimensional indicator such as a mouse.

FIG. 21 shows two line maps (FIGS. 21(a) and 21(b) respectively) in which the positions of the vertices are equal to the centres of the circles of the fractal space maps shown respectively in FIGS. 22(a) and 22(b). The regions shown in FIG. 22(a) or (b) may be "sensitive" in the sense that if a user indicates a position in the display which is inside in this case a circular region of one of the maps, this can be taken as an indication of the data file represented by the circle. For example, placing a mouse cursor inside a region may cause the display to move to that file, e.g. display information about that file. However, rather than displaying the displays 22(a) or (b), the method may alternatively display respectively the displays 21(a) or 21(b). Thus, the display may be FIG. 21(a) or (b), but the functionality of the display may be according to FIG. 22(b). That is, although the circular regions of FIG. 22 are invisible to the user, he or she can exploit their functionality.

In FIG. 10, the keypad panel includes a 3×3 array of nine numbered buttons, and the map and control panel are both drawn to correspond to this discrete keyboard. However, the concept of a user operated indicator having regions corresponding regions of the map and/or a control pad is not limited to this discrete case. For example, the indicator may include an area having a sensitive region which is able to register user motions on a high precision (e.g. substantially continuous) distance scale. When it is desired to use this indicator to indicate one of a finite number of possibilities (e.g. one of the (i+1)-th children of a given i-th file, or one of the regions of a control panel), a corresponding number of regions may be (automatically) defined within the sensitive region of the indicator, whereby the user can indicate the possibility by a motion in this region.

An example of a device according to the invention incorporating this feature is shown on FIG. 23. The indicator device is a circular indicator device 400 which is capable of registering a user pressing at any point on its circumference. The interior of the indicator device 400 includes a screen 406, which is presently displaying a fractal map. The user has already indicated a second region 407 on the fractal map, which includes 5 third regions 401, 402, 403, 404, 405 for this second region 407. The circular region 400 is automatically divided into five zones (these five zones are preferably indicated visually to the user, e.g. by different respective displayed colours within the ring 407), so that the user can select one of the third regions 401, 402, 403, 404, 405 by selecting one of the five sensitive zones.

It is envisaged that the device shown in FIG. 23 may be in the form of a watch, with the control device 400 for example being in the position of the bezel of the watch. Indeed when the fractal map is not being displayed, the device may display the time on the screen 406 (possibly by means of another fractal map). Although not illustrated in FIG. 23, the device shown may further include a labelling scheme indicating the significance of the five regions 401, 402, 403, 404, 405 (e.g. one written in the ring 407, in circumferential positions corresponding to the sensitive regions of the bezel 400).

The user may be also be able to adjust his selection by for instance pressing (or just touching) a point of the circumference, thus causing a particular position to be highlighted. They may have the option of turning the bezel while still pressing causing the highlight to move to a neighbouring (or other) region, and then release the bezel to select the new highlight as that region.

The embodiments above have been presented for the sake of example only, and the scope and spirit of the present invention is to be understood in relation to the appended claims.

What is claimed is:

1. A method of mapping logical relations between a plurality of data files comprising:
   (i) a step of, for a first file, defining a selectable first region in a display area and one or more second regions, said second regions respectively representing one or more second files logically related to the first file and being spatially related to the first region, said second regions being defined according to a first scale; and
   (ii) for each i-th file, where i=2, . . . , n, (n−1) further steps of defining one or more selectable (i+1)-th regions, said (i+1)-th regions respectively representing one or more (i+1)-th files which are logically related to the i-th file, and being spatially related to the i-th region representing that i-th file, the said (i+1)-th regions being defined according to an i-th scale smaller than the (i−1)-th scale;
   (iii) enabling and receiving user selection of one of the selectable regions defined in the display area and corresponding to one of the files; and
   (iv) in response to the received user selection of the selectable region, performing steps (i) and (ii), again using the file corresponding to said selected region as said first file.

2. The method according to claim 1 which the value of n is at least 3.

3. The method according to claim 1 wherein n depends upon any one or more of: (i) the resolution of a user's screen, (ii) the computer resources available for creating the display, (iii) the number of files a certain number of clicks away from the first file, or (iv) an earlier selection by a user.

4. The method according to claim 1 in which, a user is able to select any file.

5. The method of claim 1 in which the shape of at least one of the (i+1)-th regions for the (i+1)-th files logically related to a given i-th file is determined by a rule;
   said rule being independent of i and/or the number of said (i+1)-th files.

6. The-method of claim 1 further including, defining a rule which determines whether any one of said data files is logically related to any other one of said data files.

7. The method of claim 1 wherein for a selected j-th file (where 1≦j≦n) represented by one of said regions, files that has a predetermined logical connection to the (j)-th file, each additional region including data indicating a significance of said respective connected file.

8. The method according to claim 7 in which the selection of one of the additional regions is equivalent to the selection of the region corresponding to the said said additional region.

9. The method of claim 7 wherein the predetermined logical connection is that the data files for which additional regions are displayed are the j-th data files logically related to the same (j-1)-th data file as the selected j-th data file.

10. The method of claim 7 wherein the predetermined logical connection is that the data files for which additional regions are displayed are the (j+1)-th data files logically related to the selected j-th data file.

11. The method accroding to claim 1 wherein said second regions have a size according to said first scale and said (i+l)-th regions have a size according to said i-th scale.

12. The method according to claim 1, in which the respective scales of the (i+1)-th regions for the (i+1)-th files logically related to a given i-th file are the i-th scale multiplied by a value which is a function of a variable characterizing the respective (i+1)-th file.

13. The method according to claim 1, in which said scales are chosen to decrease with i according to a predetermined relation such that irrespective of n, the total area of the regions defined in the display area never exceeds a predetermined value.

14. The method according to claim 1 in which the (i+1)-th regions for the (i+1)-th files logically related to an i-th file are spatially arranged relative to each other with an angular relationship determined by a rule, said rule being independent of i.

15. The method according to according to claim 1 in which the first file is a data file which corresponds to a present browser location of a user.

16. The method according to claim 15, which is performed upon the present browser location of the user changing.

17. The method according to claim 1, wherein at least one criterion is used to identify a subset of (i+1)-th regions logically related to the i-th file, the method not displaying regions for said subset of identified (i−1)-th files.

18. The method according to claim 17 in which said at least one said criterion is that an identified file is already represented on the map, or that an identified file's logical relationship to another data file to which it is logically related is already represented on the map.

19. The method according to claim 17 in which said at least one criterion is such that if there are more than a predetermined number M of (i+1)-th data files logically related to a given i-th file, the method displays M (i+1)-th regions, respectively representing only M of those (i+1)-th files.

20. The method according to claim 1 wherein the graphical characteristics of at least one said region are in accordance with characteristics of the respective file represented by that region.

21. The method according to claim 1 in which for i=1, . . . n the (i+1)-th regions for the (i+1)-th files logically related to an i-th file are spatially arranged in a two dimensional formation in relation to the i-th region for the said i-th file.

22. The method according to claim 1 wherein a constraint is imposed by a predetermined size and arrangement rule, and the (i+1)-th regions are as large as possible within a the said constraint.

23. A The method according to claim 1 wherein a user has an option of redefining the rules determining graphical characteristics of the regions and/or their size and/or their arrangement within the display area.

24. The method according to claim 1 further comprising a generating a second map, including areas respectively representing (i+1)-th regions of a a selected i-th region, said areas having relative positions corresponding to the relative positions of the (i+1)-th regions.

25. The method of claim 1 in which the (i+1)-th regions for the (i+1)-th files logically related to an i-th file are arranged within the i-th region for the said i-th file.

26. The method of claim 1 in which the i-th region corresponding to an i-th file has a periphery, and in which the (i+1)-th regions for the (i+1)-th files logically related to the said i-th file are arranged near the periphery of the i-th region for the said i-th file.

27. The method of claim 1 in which the i-th region corresponding to an i-th file has a centre, and in which the (i+1)-th regions for the (i+1)-th files logically related to the said i-th file are arranged around the centre of the i-th region.

28. The method of claim 1 in which a number of (i+1)-th files logically are related to an i-th file, and in which the (i+1)-th regions for the (i+1)-th files logically related to the said i-th file are arranged relative to said i-th region in positions dependent upon the number of said (i+1)-th files.

29. The method of claim 1 including displaying the regions in the display area.

30. The method of claim 1 in which an overlapping display configuration exists for at least some of the (i+1)-th regions representing some of the (i+1)-th files associated with an i-th file.

31. The method according to claim 1 further comprising generating a second map in which the logical relations between the i-th files and the (i+1)-th files of the second map are different from the logical relations between the i-th files and the (i+1)-th files of the first map.

32. The method of claim 31 in which the logical relations between the files of the second map represent an inverse of the logical relations between the files of the first map.

33. The method of claim 1 in which the selection of a region causes the file represented by the region to be opened.

34. The method of claim 1 wherein said (i+1)-th regions respectively represent one or more (i+1)-th files that are heirarchically dominant or subordinate to the i-th file, such that regions corresponding to dominant and subordinate files are concurrently selectable.

35. The method of claim 1 further comprising changing a scale associated with the selected region when performing steps (i) and (ii) again using the file corresponding to the selected region as the first file.

36. The method of claim 35 wherein changing the scale comprises increasing the scale associated with the selected region.

37. The method of claim 35 further comprising sizing the selected region as the largest of the regions when performing steps (i) and (ii) again using the file corresponding to the selected region as the first file.

38. A method of mapping logical relations between a plurality of segments of one or more data files, comprising:
(i) a step of, for a first segment, defining a first selectable region in a display area and one or more second regions, which respectively represent one or more second segments logically related to the first segment, and which are spatially related to the first region, the said second regions being defined according to a first scale;
(ii) for each i-th portion of the file, where i=2, . . . , n, (n+1) further steps of defining one or more selectable (i+1)-th regions, which respectively represent one or more (i+1)-th segments which are logically related to the i-th segment, and which are spatially related to the i-th region representing that i-th segment, said (i+1)-th regions being defined according to an i-th scale smaller that the (i−1)-th scale
(iii) enabling and receiving user selection of one of the selectable regions defined in the display area and corresponding to one of the segments; and
(iv) in response to the user selection of the selectable display region, performing steps (i) and (ii) again using said selected segment as said first segment.

39. A device comprising a display means having a display area on which a map of logical relations between a plurality of data files is displayed, the map being generated by:
(i) a step of, for a first file, in a display area displaying defining a selectable first region in a display area and one or more second regions, said second regions respectively representing one or more second files logically related to the first file and being spatially related to the first region, sizes of said second regions being defined according to a first distance scale; and
(ii) for each i-th file, where i=2, . . . , n, (n-1) further steps of displaying defining one or more selectable (i+1)-th regions, said (i+1)-th regions respectively representing one or more (i+1)-th files which are logically related to the i-th file, and being spatially related to the i-th region representing that i-th file, the sizes of said (i+1)-th regions being defined according to an i-th distance scale smaller than the (i−1)-th distance scale;
(iii) enabling and receiving user selection of one of the selectable regions defined in the display area and corresponding to one of the files; and
(iv) in response to the received user selection of the selectable region, performing steps (i) and (ii) again using the file corresponding to said selected region as said first file.

40. A device according to claim 39 in which the display area is on a portable device.

41. A device according to claim 39 in which the display area is on a mobile telephone.

42. A computer program product, tangibly embodied in an information carrier, for displaying logical relations between a plurality of data files, the computer program product being operable to cause data processing apparatus to:

(i) a step of, for a first file, in a display area displaying defining a selectable first region in a display area and one or more second regions, said second regions respectively representing one or more second files logically related to the first file and being spatially related to the first region, sizes of said second regions being defined according to a first distance scale; and (ii) for each i-th file, where i=2, ..., n, (n−1) further steps of displaying defining one or more selectable (i+1)-th regions, said (i+1)-th regions respectively representing one or more (i+1)-th files which are logically related to the i-th file, and being spatially related to the i-th region representing that i-th file, the sizes of said (i+1)-th regions being defined according to an i-th distance scale smaller than the (i−1)-th distance scale;

(iii) enabling and receiving user selection of one of the selectable regions- defined in the display area and corresponding to one of the files; and (iv) in response to the received user selection of the selectable region, performing steps (i) and (ii) again using the file corresponding to said selected region as said first file.

* * * * *